US012004162B2

United States Patent
Saggar et al.

(10) Patent No.: US 12,004,162 B2
(45) Date of Patent: Jun. 4, 2024

(54) TECHNIQUES FOR MODIFYING A SPATIAL RELATIONSHIP OF AN UPLINK CHANNEL

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/547,702

(22) Filed: Dec. 10, 2021

(65) Prior Publication Data

US 2023/0189267 A1 Jun. 15, 2023

(51) Int. Cl.
*H04W 72/21* (2023.01)
*H04W 72/044* (2023.01)

(52) U.S. Cl.
CPC ......... *H04W 72/21* (2023.01); *H04W 72/046* (2013.01)

(58) Field of Classification Search
CPC .............................. H04W 72/21; H04W 72/046
USPC ........................................................ 370/329
See application file for complete search history.

(56) References Cited

U.S. PATENT DOCUMENTS

| 2022/0353707 | A1* | 11/2022 | Cirik | ..................... H04L 5/0048 |
| 2022/0361202 | A1* | 11/2022 | Yi | ......................... H04W 24/10 |
| 2023/0080431 | A1* | 3/2023 | Matsumura | ........... H04W 16/28 370/329 |
| 2023/0299900 | A1* | 9/2023 | Gao | ..................... H04W 72/232 370/330 |
| 2023/0309109 | A1* | 9/2023 | Gao | ....................... H04L 5/0055 |
| 2023/0345493 | A1* | 10/2023 | Cirik | ......................... H04L 1/08 |

\* cited by examiner

*Primary Examiner* — Peter G Solinsky
(74) *Attorney, Agent, or Firm* — QUALCOMM Incorporated

(57) ABSTRACT

Methods, systems, and devices for wireless communication are described. A user equipment (UE) may receive signaling from a base station that schedules the UE to transmit a second uplink signal using a second spatial relationship following transmission of a first uplink signal using a first spatial relationship. The second uplink signal may be scheduled within a beam switching gap associated with switching from the first spatial relationship to the second spatial relationship. In some examples, the UE may transmit the second uplink signal using the first spatial relationship, rather than switching to using the second spatial relationship. In some examples, the UE may shorten the first uplink signal or the second uplink signal (or both) to accommodate the beam switching gap.

30 Claims, 18 Drawing Sheets

TECHNIQUES FOR MODIFYING A SPATIAL RELATIONSHIP OF AN UPLINK CHANNEL

FIELD OF TECHNOLOGY

The following relates to wireless communication, including techniques for modifying a spatial relationship of an uplink channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may include one or more base stations and one or more UEs communicating using one or more beams. However, in some cases, existing beamforming techniques may be deficient.

SUMMARY

The described techniques relate to improved methods, systems, devices, and apparatuses that support techniques for modifying a spatial relationship of an uplink channel. Generally, the described techniques provide for adjusting uplink transmission scheduling based on a beam switching gap. A user equipment (UE) may receive signaling from a base station that schedules the UE to transmit a second uplink signal using a second spatial relationship following transmission of a first uplink signal using a first spatial relationship. The second uplink signal may be scheduled within a beam switching gap associated with switching from the first spatial relationship to the second spatial relationship. In some examples, the UE may transmit the second uplink signal using the first spatial relationship, rather than switching to using the second spatial relationship. In some examples, the UE may shorten the first uplink signal or the second uplink signal (or both) to accommodate the beam switching gap.

A method for wireless communication at a UE is described. The method may include receiving control signaling indicating a second spatial relation parameter different from a first spatial relation parameter, the second spatial relation parameter to be used for transmission of a second uplink signal after transmission of a first uplink signal using the first spatial relation parameter, transmitting the first uplink signal using the first spatial relation parameter, and transmitting, in response to receiving the control signaling, the second uplink signal using the first spatial relation parameter based on a size of a switch duration associated with using the second spatial relation parameter after using the first spatial relation parameter.

An apparatus for wireless communication at a UE is described. The apparatus may include a processor, memory coupled with the processor, and instructions stored in the memory. The instructions may be executable by the processor to cause the apparatus to receive control signaling indicating a second spatial relation parameter different from a first spatial relation parameter, the second spatial relation parameter to be used for transmission of a second uplink signal after transmission of a first uplink signal using the first spatial relation parameter, transmit the first uplink signal using the first spatial relation parameter, and transmit, in response to receiving the control signaling, the second uplink signal using the first spatial relation parameter based on a size of a switch duration associated with using the second spatial relation parameter after using the first spatial relation parameter.

Another apparatus for wireless communication at a UE is described. The apparatus may include means for receiving control signaling indicating a second spatial relation parameter different from a first spatial relation parameter, the second spatial relation parameter to be used for transmission of a second uplink signal after transmission of a first uplink signal using the first spatial relation parameter, means for transmitting the first uplink signal using the first spatial relation parameter, and means for transmitting, in response to receiving the control signaling, the second uplink signal using the first spatial relation parameter based on a size of a switch duration associated with using the second spatial relation parameter after using the first spatial relation parameter.

A non-transitory computer-readable medium storing code for wireless communication at a UE is described. The code may include instructions executable by a processor to receive control signaling indicating a second spatial relation parameter different from a first spatial relation parameter, the second spatial relation parameter to be used for transmission of a second uplink signal after transmission of a first uplink signal using the first spatial relation parameter, transmit the first uplink signal using the first spatial relation parameter, and transmit, in response to receiving the control signaling, the second uplink signal using the first spatial relation parameter based on a size of a switch duration associated with using the second spatial relation parameter after using the first spatial relation parameter.

Some examples of the method, apparatuses, and non-transitory computer-readable medium described herein may further include operations, features, means, or instructions for transmitting, in response to receiving the control signaling, a third uplink signal using the second spatial relation parameter based on the size of the switch duration, where the control signaling further indicates the second spatial relation parameter may be to be used for transmission of the third uplink signal.

In some examples of the method, apparatuses, and non-transitory computer-readable medium described herein, a first size of a first duration between a first allocation associated with the first uplink signal and a second allocation associated with the second uplink signal may be less than the size of the switch duration and a second size of a second duration between the second allocation associated with the second uplink signal and a third allocation associated with the third uplink signal may be greater than the size of the switch duration.

Some examples of the method, apparatuses, and non-transitory computer-readable medium described herein may further include operations, features, means, or instructions for transmitting, in response to receiving the control signaling, a third uplink signal using the first spatial relation parameter based on the size of the switch duration, where the control signaling indicates the second spatial relation parameter may be to be used for transmission of the third uplink signal.

In some examples of the method, apparatuses, and non-transitory computer-readable medium described herein, a first size of a first duration between a first allocation associated with the first uplink signal and a second allocation associated with the second uplink signal may be less than the size of the switch duration and a second size of a second duration between the second allocation associated with the second uplink signal and a third allocation associated with the third uplink signal may be less than the size of the switch duration.

Some examples of the method, apparatuses, and non-transitory computer-readable medium described herein may further include operations, features, means, or instructions for receiving signaling indicating a cancellation of a third uplink signal based on based on the size of the switch duration.

Some examples of the method, apparatuses, and non-transitory computer-readable medium described herein may further include operations, features, means, or instructions for discarding the indication of the second spatial parameter based on an expiration of a timer associated with the control signaling.

In some examples of the method, apparatuses, and non-transitory computer-readable medium described herein, the control signaling includes a serving cell identifier, a bandwidth part identifier, a resource identifier associated with the second uplink signal, one or more bits indicating the second spatial parameter, one or more reserved bits, or any combination thereof.

In some examples of the method, apparatuses, and non-transitory computer-readable medium described herein, the control signaling includes a downlink control information message or a medium access control (MAC) control element (MAC-CE).

In some examples of the method, apparatuses, and non-transitory computer-readable medium described herein, the first uplink signal includes a first physical uplink shared channel (PUSCH), a first physical uplink control channel (PUCCH), or both and the second uplink signal includes a second PUSCH, a second PUCCH, or both.

A method for wireless communication at a UE is described. The method may include receiving control signaling indicating a second spatial relation parameter different from a first spatial relation parameter, the second spatial relation parameter to be used for transmission of a second uplink signal after transmission of a first uplink signal using the first spatial relation parameter, transmitting a first portion of the first uplink signal using the first spatial relation parameter based on a size of a switch duration associated with using the second spatial relation parameter after using the first spatial relation parameter, and transmitting, in response to receiving the control signaling, a second portion of the second uplink signal using the second spatial relation parameter based on the size of the switch duration.

An apparatus for wireless communication at a UE is described. The apparatus may include a processor, memory coupled with the processor, and instructions stored in the memory. The instructions may be executable by the processor to cause the apparatus to receive control signaling indicating a second spatial relation parameter different from a first spatial relation parameter, the second spatial relation parameter to be used for transmission of a second uplink signal after transmission of a first uplink signal using the first spatial relation parameter, transmit a first portion of the first uplink signal using the first spatial relation parameter based on a size of a switch duration associated with using the second spatial relation parameter after using the first spatial relation parameter, and transmit, in response to receiving the control signaling, a second portion of the second uplink signal using the second spatial relation parameter based on the size of the switch duration.

Another apparatus for wireless communication at a UE is described. The apparatus may include means for receiving control signaling indicating a second spatial relation parameter different from a first spatial relation parameter, the second spatial relation parameter to be used for transmission of a second uplink signal after transmission of a first uplink signal using the first spatial relation parameter, means for transmitting a first portion of the first uplink signal using the first spatial relation parameter based on a size of a switch duration associated with using the second spatial relation parameter after using the first spatial relation parameter, and means for transmitting, in response to receiving the control signaling, a second portion of the second uplink signal using the second spatial relation parameter based on the size of the switch duration.

A non-transitory computer-readable medium storing code for wireless communication at a UE is described. The code may include instructions executable by a processor to receive control signaling indicating a second spatial relation parameter different from a first spatial relation parameter, the second spatial relation parameter to be used for transmission of a second uplink signal after transmission of a first uplink signal using the first spatial relation parameter, transmit a first portion of the first uplink signal using the first spatial relation parameter based on a size of a switch duration associated with using the second spatial relation parameter after using the first spatial relation parameter, and transmit, in response to receiving the control signaling, a second portion of the second uplink signal using the second spatial relation parameter based on the size of the switch duration.

Some examples of the method, apparatuses, and non-transitory computer-readable medium described herein may further include operations, features, means, or instructions for discarding a third portion of the first uplink signal based on the size of the switch duration, where the first uplink signal includes the first portion and the third portion.

Some examples of the method, apparatuses, and non-transitory computer-readable medium described herein may further include operations, features, means, or instructions for discarding a third portion of the second uplink signal based on the size of the switch duration, where the second uplink signal includes the second portion and the third portion.

Some examples of the method, apparatuses, and non-transitory computer-readable medium described herein may further include operations, features, means, or instructions for receiving signaling indicating a third portion to be discarded based on the size of the switch duration, where the first uplink signal or the second uplink signal includes the third portion.

Some examples of the method, apparatuses, and non-transitory computer-readable medium described herein may further include operations, features, means, or instructions for transmitting signaling indicating a switching capability of the UE, where the signaling indicating the third portion may be received in response to the signaling indicating the switching capability.

In some examples of the method, apparatuses, and non-transitory computer-readable medium described herein, the first portion of the first uplink signal and the second portion of the second uplink signal may be transmitted in response to receiving the signaling indicating the third portion.

In some examples of the method, apparatuses, and non-transitory computer-readable medium described herein, the third portion includes a symbol or a portion of a symbol.

In some examples of the method, apparatuses, and non-transitory computer-readable medium described herein, the control signaling includes a serving cell identifier, a bandwidth part identifier, a resource identifier associated with the second uplink signal, one or more bits indicating the second spatial parameter, one or more reserved bits, or any combination thereof.

In some examples of the method, apparatuses, and non-transitory computer-readable medium described herein, the control signaling includes a downlink control information message or a MAC-CE.

In some examples of the method, apparatuses, and non-transitory computer-readable medium described herein, the first uplink signal includes a first PUSCH, a first PUCCH, or both and the second uplink signal includes a second PUSCH, a second PUCCH, or both.

A method for wireless communication at a base station is described. The method may include transmitting, to a UE, control signaling indicating a second spatial relation parameter different from a first spatial relation parameter, the second spatial relation parameter to be used for transmission of a second uplink signal after transmission of a first uplink signal using the first spatial relation parameter, receiving the first uplink signal in accordance with the first spatial relation parameter, and receiving, in response to transmitting the control signaling, the second uplink signal in accordance with the first spatial relation parameter based on a size of a switch duration associated with using the second spatial relation parameter after using the first spatial relation parameter.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a second spatial relation parameter different from a first spatial relation parameter, the second spatial relation parameter to be used for transmission of a second uplink signal after transmission of a first uplink signal using the first spatial relation parameter, receive the first uplink signal in accordance with the first spatial relation parameter, and receive, in response to transmitting the control signaling, the second uplink signal in accordance with the first spatial relation parameter based on a size of a switch duration associated with using the second spatial relation parameter after using the first spatial relation parameter.

Another apparatus for wireless communication at a base station is described. The apparatus may include means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter, means for receiving the first uplink signal in accordance with the first spatial relation parameter, and means for receiving, in response to transmitting the control signaling, the second uplink signal in accordance with the first spatial relation parameter based on a size of a switch duration associated with using the second spatial relation parameter after using the first spatial relation parameter.

A non-transitory computer-readable medium storing code for wireless communication at a base station is described. The code may include instructions executable by a processor to transmit, to a UE, control signaling indicating a second spatial relation parameter different from a first spatial relation parameter, the second spatial relation parameter to be used for transmission of a second uplink signal after transmission of a first uplink signal using the first spatial relation parameter, receive the first uplink signal in accordance with the first spatial relation parameter, and receive, in response to transmitting the control signaling, the second uplink signal in accordance with the first spatial relation parameter based on a size of a switch duration associated with using the second spatial relation parameter after using the first spatial relation parameter.

Some examples of the method, apparatuses, and non-transitory computer-readable medium described herein may further include operations, features, means, or instructions for receiving, in response to transmitting the control signaling, a third uplink signal in accordance with the second spatial relation parameter based on the size of the switch duration, where the control signaling further indicates the second spatial relation parameter may be to be used for transmission of the third uplink signal.

In some examples of the method, apparatuses, and non-transitory computer-readable medium described herein, a first size of a first duration between a first allocation associated with the first uplink signal and a second allocation associated with the second uplink signal may be less than the size of the switch duration and a second size of a second duration between the second allocation associated with the second uplink signal and a third allocation associated with the third uplink signal may be greater than the size of the switch duration.

Some examples of the method, apparatuses, and non-transitory computer-readable medium described herein may further include operations, features, means, or instructions for receiving, in response to transmitting the control signaling, a third uplink signal in accordance with the first spatial relation parameter based on the size of the switch duration, where the control signaling indicates the second spatial relation parameter may be to be used for transmission of the third uplink signal.

In some examples of the method, apparatuses, and non-transitory computer-readable medium described herein, a first size of a first duration between a first allocation associated with the first uplink signal and a second allocation associated with the second uplink signal may be less than the size of the switch duration and a second size of a second duration between the second allocation associated with the second uplink signal and a third allocation associated with the third uplink signal may be less than the size of the switch duration.

Some examples of the method, apparatuses, and non-transitory computer-readable medium described herein may further include operations, features, means, or instructions for receiving signaling indicating a cancellation of a third uplink signal based on based on the size of the switch duration.

In some examples of the method, apparatuses, and non-transitory computer-readable medium described herein, the control signaling includes a serving cell identifier, a bandwidth part identifier, a resource identifier associated with the second uplink signal, one or more bits indicating the second spatial parameter, one or more reserved bits, or any combination thereof.

In some examples of the method, apparatuses, and non-transitory computer-readable medium described herein, the control signaling includes a downlink control information message or a MAC-CE.

In some examples of the method, apparatuses, and non-transitory computer-readable medium described herein, the first uplink signal includes a first PUSCH, a first PUCCH, or both and the second uplink signal includes a second PUSCH, a second PUCCH, or both.

A method for wireless communication at a base station is described. The method may include transmitting, to a UE, control signaling indicating a second spatial relation parameter different from a first spatial relation parameter, the second spatial relation parameter to be used for transmission of a second uplink signal after transmission of a first uplink signal using the first spatial relation parameter, receiving a first portion of the first uplink signal in accordance with the first spatial relation parameter based on a size of a switch duration associated with using the second spatial relation parameter after using the first spatial relation parameter, and receiving, in response to transmitting the control signaling, a second portion of the second uplink signal in accordance with the second spatial relation parameter.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a second spatial relation parameter different from a first spatial relation parameter, the second spatial relation parameter to be used for transmission of a second uplink signal after transmission of a first uplink signal using the first spatial relation parameter, receive a first portion of the first uplink signal in accordance with the first spatial relation parameter based on a size of a switch duration associated with using the second spatial relation parameter after using the first spatial relation parameter, and receive, in response to transmitting the control signaling, a second portion of the second uplink signal in accordance with the second spatial relation parameter.

Another apparatus for wireless communication at a base station is described. The apparatus may include means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter, means for receiving a first portion of the first uplink signal in accordance with the first spatial relation parameter based on a size of a switch duration associated with using the second spatial relation parameter after using the first spatial relation parameter, and means for receiving, in response to transmitting the control signaling, a second portion of the second uplink signal in accordance with the second spatial relation parameter.

A non-transitory computer-readable medium storing code for wireless communication at a base station is described. The code may include instructions executable by a processor to transmit, to a UE, control signaling indicating a second spatial relation parameter different from a first spatial relation parameter, the second spatial relation parameter to be used for transmission of a second uplink signal after transmission of a first uplink signal using the first spatial relation parameter, receive a first portion of the first uplink signal in accordance with the first spatial relation parameter based on a size of a switch duration associated with using the second spatial relation parameter after using the first spatial relation parameter, and receive, in response to transmitting the control signaling, a second portion of the second uplink signal in accordance with the second spatial relation parameter.

Some examples of the method, apparatuses, and non-transitory computer-readable medium described herein may further include operations, features, means, or instructions for refraining from monitoring for a third portion of the first uplink signal based on the size of the switch duration, where the first uplink signal includes the first portion and the third portion.

Some examples of the method, apparatuses, and non-transitory computer-readable medium described herein may further include operations, features, means, or instructions for refraining from monitoring for a third portion of the second uplink signal based on the size of the switch duration, where the second uplink signal includes the second portion and the third portion.

Some examples of the method, apparatuses, and non-transitory computer-readable medium described herein may further include operations, features, means, or instructions for transmitting signaling indicating a third portion to be discarded based on the size of the switch duration, where the first uplink signal or the second uplink signal includes the third portion.

Some examples of the method, apparatuses, and non-transitory computer-readable medium described herein may further include operations, features, means, or instructions for receiving signaling indicating a switching capability of the UE, where the signaling indicating the third portion may be transmitted in response to the signaling indicating the switching capability.

In some examples of the method, apparatuses, and non-transitory computer-readable medium described herein, the first portion of the first uplink signal and the second portion of the second uplink signal may be received in response to receiving the signaling indicating the third portion.

In some examples of the method, apparatuses, and non-transitory computer-readable medium described herein, the third portion includes a symbol or a portion of a symbol.

In some examples of the method, apparatuses, and non-transitory computer-readable medium described herein, the control signaling includes a serving cell identifier, a bandwidth part identifier, a resource identifier associated with the second uplink signal, one or more bits indicating the second spatial parameter, one or more reserved bits, or any combination thereof.

In some examples of the method, apparatuses, and non-transitory computer-readable medium described herein, the control signaling includes a downlink control information message or a MAC-CE.

In some examples of the method, apparatuses, and non-transitory computer-readable medium described herein, the first uplink signal includes a first PUSCH, a first PUCCH, or both and the second uplink signal includes a second PUSCH, a second PUCCH, or both.

DETAILED DESCRIPTION

Figure 1:
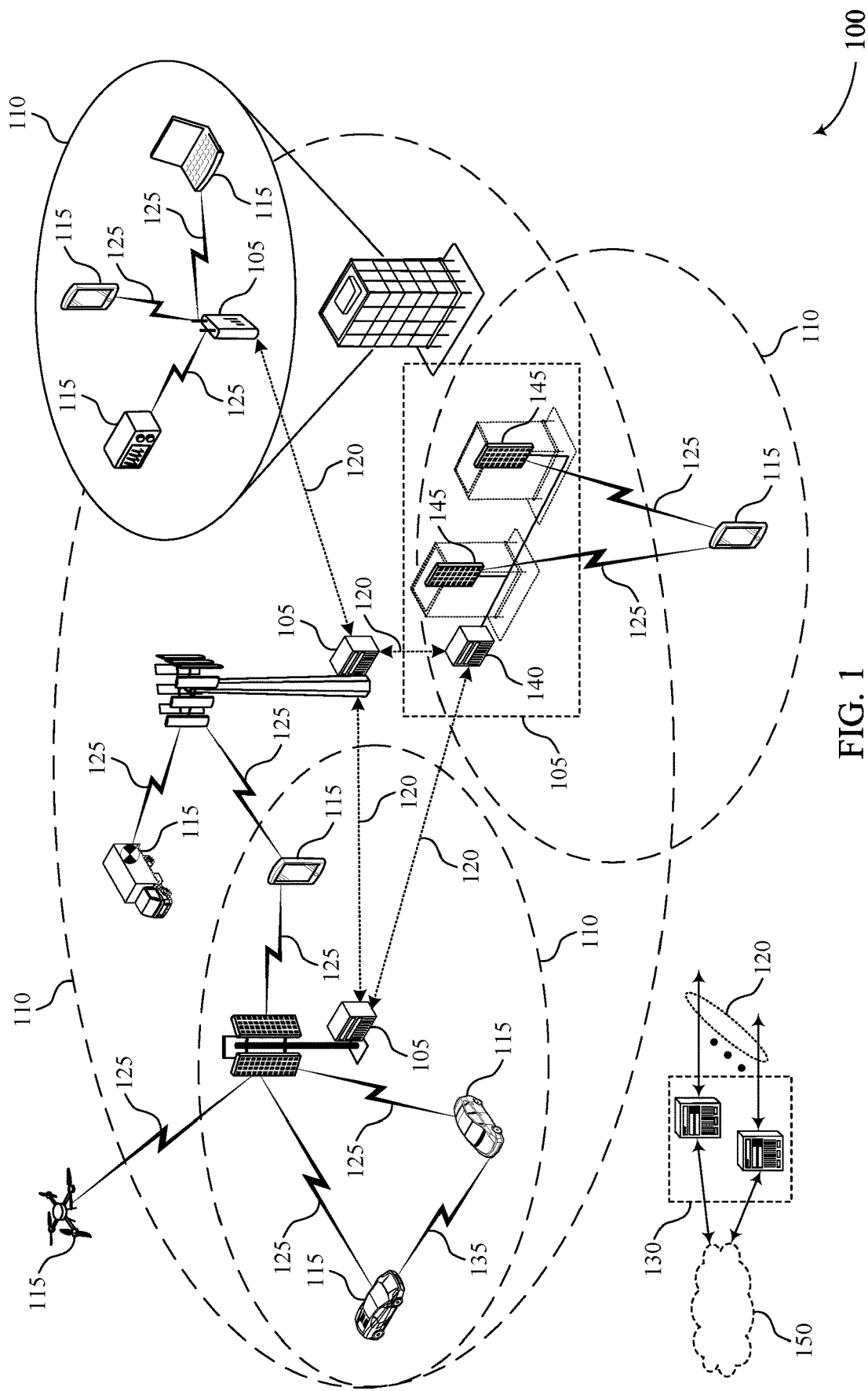
FIG. 1 illustrates an example of a wireless communications system that supports techniques for modifying a spatial relationship of an uplink channel in accordance with aspects of the present disclosure.

In a wireless communications system, a base station and a user equipment (UE) may communicate using one or more beams (e.g., spatial relationships) in millimeter wave (mmW) frequency ranges, e.g., from 25 gigahertz (GHz) to 300 GHz. In some cases, a base station may signal a beam switch to a UE based on changes in channel conditions, scheduling factors, or other considerations. Based on the signaling from the base station, the UE may adjust one or more antennas to switch to using a new spatial relationship. A duration (e.g., 100 nanoseconds (ns)) associated with adjusting the antennas to use the new spatial relationship may be referred to as a beam switching gap. In some cases, the beam switching gap may occur during a cyclic prefix (CP) duration, and so the base station may not schedule an additional beam switching gap between uplink or downlink channels. However, at some higher frequency ranges, such as Frequency Range 4 (FR4, which may include operations around 90 GHz) or Frequency Range 5 (FR5, which may include operations around 140 GHz), the CP duration may be less than the beam switching gap. As a result, uplink transmissions scheduled to be transmitted using different spatial relationships may be within a beam switching gap of each other, and a UE may not have time to switch spatial relationships between the scheduled uplink transmissions.

According to the techniques described herein, uplink transmission scheduling may be adjusted based on a beam switching gap. A UE may receive signaling from a base station that schedules the UE to transmit a second uplink signal using a second spatial relationship following transmission of a first uplink signal using a first spatial relationship. The second uplink signal may be scheduled within a beam switching gap associated with switching from the first spatial relationship to the second spatial relationship.

In a first example, the UE may transmit the second uplink signal using the first spatial relationship, rather than switching to using the second spatial relationship. If multiple uplink signals are scheduled to use the second spatial relationship, the UE may continue to transmit uplink signals using the first spatial relationship until a gap between transmissions is greater than the beam switching gap, at which point the UE may switch to using the second spatial relationship. In some examples, the UE may discard the indication of the switch to using the second spatial relationship if a timer expires before a beam switching gap is available.

In a second example, the UE may shorten the first uplink signal or the second uplink signal (or both) to accommodate the beam switching gap. For example, if the first uplink signal includes a set of repetitions of a physical uplink control channel (PUCCH) or physical uplink shared channel (PUSCH) transmission, the UE may refrain from transmitting repetitions at the end of the first uplink signal to accommodate the beam switching gap before the beginning of the second uplink signal. Similarly, if the second uplink signal includes a set of repetitions of a PUCCH or PUSCH transmission, the UE may refrain from transmitting repetitions at the beginning of the second uplink signal to accommodate the beam switching gap. The base station may configure the UE with a duration (e.g., a symbol or a portion of a symbol) that may be discarded from uplink signals to accommodate the beam switching gap.

Aspects of the disclosure are initially described in the context of wireless communications systems, transmission schemes, and process flows. Aspects of the disclosure are further illustrated by and described with reference to apparatus diagrams, system diagrams, and flowcharts that relate to techniques for modifying a spatial relationship of an uplink channel.

FIG. 1 illustrates an example of a wireless communications system 100 that supports techniques for modifying a spatial relationship of an uplink channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, A UE 115 may receive signaling from a base station 105 that schedules the UE 115 to transmit a second uplink signal using a second spatial relationship following transmission of a first uplink signal using a first spatial relationship. The second uplink signal may be scheduled within a beam switching gap associated with switching from the first spatial relationship to the second spatial relationship. In some examples, the UE 115 may transmit the second uplink signal using the first spatial relationship, rather than switching to using the second spatial relationship. In some examples, the UE 115 may shorten the first uplink signal or the second uplink signal (or both) to accommodate the beam switching gap.

Figure 2:
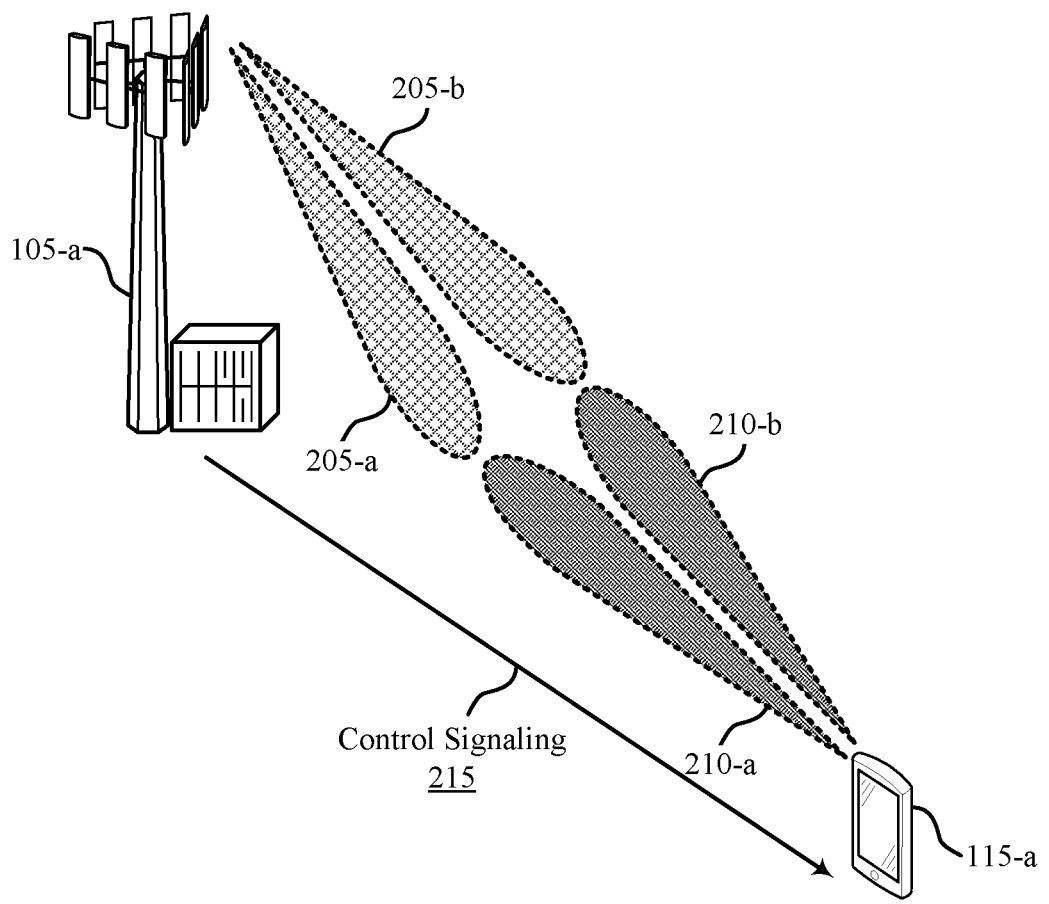
FIG. 2 illustrates an example of a wireless communications system that supports techniques for modifying a spatial relationship of an uplink channel in accordance with aspects of the present disclosure.

FIG. 2 illustrates an example of a wireless communications system 200 that supports techniques for modifying a spatial relationship of an uplink channel in accordance with aspects of the present disclosure. In some examples, the wireless communications system 200 may implement aspects of the wireless communications system 100. For example, the wireless communications system 200 may include a base station 105-a and a UE 115-a, which may be examples of the corresponding devices described with reference to FIG. 1. The wireless communications system 200 may include features for improved communications between the UE 115-a and the base station 105-a, among other benefits.

The base station 105-a may communicate with the UE 115-a using beamforming techniques. The base station 105-a may transmit control signaling 215 to the UE 115-a to initialize a beam sweep procedure, in which the base station 105-a and the UE 115-a may identify one or more base station beams 205 and one or more UE beams 210 for beamformed communications based on the beam sweep procedure. For example, the base station 105-a and the UE 115-a may select base station beams 205-a and 205-b from a set of base station beams 205 based on the beam sweep procedure. Similarly, the base station 105-a and the UE 115-a may select UE beams 210-a and 210-b from a set of UE beams 210 based on the beam sweep procedure.

Individual base station beams 205 may correspond to individual UE beams 210 for communications in the wireless communications system 200. In some examples, the communications illustrated in FIG. 2 may include downlink transmissions to the UE 115-a, in which the base station beams 205 may be transmission beams and the UE beams 210 may be reception beams. Additionally or alternatively, the communications illustrated in FIG. 2 may include uplink transmissions from the UE 115-a, in which the base station beams 205 may be reception beams and the UE beams 210 may be transmission beams.

In some cases, the base station 105-a may indicate a beam switch to the UE 115-a in control signaling 215 based on changes in channel conditions, scheduling factors, or other considerations. For example, the base station 105-a may specify one or more spatial relationships (e.g., corresponding to the UE beams 210) for uplink transmissions. Subsequently, the base station 105-a may transmit the control signaling 215 to activate one of the spatial relationships. In some examples, the control signaling 215 may be a MAC control element (MAC-CE). The MAC-CE may include a serving cell identifier that indicates the serving cell of the base station 105-a to which the MAC-CE applies, a BWP identifier, a resource identifier that indicates the uplink transmission (e.g., a PUCCH) to which the MAC-CE applies, one or more reserved bits (e.g., which may be set to 0), a spatial relation identifier, or any combination thereof. The spatial relation identifier may indicate the spatial relationship to be used for the uplink transmission. For example, the base station 105-a may specify 8 spatial relationships, and the spatial relation identifier may include 8 bits, one for each spatial relationship. One bit may be set to 1, indicating which spatial relationship is to be activated, and the remaining bits may be set to 0. In some examples, the activated spatial relationship may be a quasi-co-location (QCL) relationship with one or more reference signals associated with the UE beams 210. The reference signals may include a CSI-RS, a synchronization signal block (SSB), a sounding reference signal (SRS), or any combination thereof.

After the control signaling 215 arrives to activate the spatial relationship, the UE 115-a may apply a spatial domain filter associated with the spatial relationship. For example, the UE 115-a may apply the spatial domain filter in a first slot following a slot k+$N_{slot}^{subframe,\mu}$, where k may be a slot in which the UE 115-*a* transmits feedback (e.g., an acknowledgment (ACK) message) for the control signaling 215, μ may be a numerology that corresponds to the SCS (e.g., the SCS may be $2^\mu \cdot 15$ kHz), and $N_{slot}^{subframe,\mu}$ may be a quantity of slots in a subframe at the SCS corresponding to μ. In some examples, the base station 105-*a*

Based on the indication in the control signaling 215 from the base station 105-*a*, the UE 115-*a* may adjust one or more antennas to switch to using a new UE beam 210 (e.g., switch from using the UE beam 210-*a* to using the UE beam 210-*b*). The UE 115-*a* may adjust one or more antennas within a beam switching gap (e.g., 100 ns) to switch to using the new UE beam 210. In some cases, the beam switching gap may occur during a CP duration, and so the base station 105-*a* may not schedule an additional beam switching gap between uplink or downlink channels. For example, when the UE 115-*a* communicates on a carrier with a subcarrier spacing (SCS) of 240 kilohertz (kHz), a CP duration may be 293 ns. However, at some higher frequency ranges, such as FR4 or FR5, the CP duration may be less than the beam switching gap. For example, a carrier with an SCS of 1920 kHz may have a CP duration of 36.62 ns, or a carrier with an SCS of 3840 kHz may have a CP duration of 18.31 ns, either of which may be less than a beam switching gap of 100 ns. As a result, uplink transmissions scheduled to be transmitted using different UE beams 210 may be within a beam switching gap of each other, and the UE 115-*a* may not have time to switch UE beams 210 between the scheduled uplink transmissions.

As described herein, uplink transmission scheduling may be adjusted based on a beam switching gap. The control signaling 215 may schedule the UE 115-*a* to transmit a second uplink signal using the UE beam 210-*b* following transmission of a first uplink signal using the UE beam 210-*a*. The second uplink signal may be scheduled within a beam switching gap associated with switching from the UE beam 210-*a* to the UE beam 210-*b*.

In a first example, the UE 115-*a* may transmit the second uplink signal using the UE beam 210-*a*, rather than switching to using the UE beam 210-*b*. If multiple uplink signals are scheduled to use the UE beam 210-*b*, the UE 115-*a* may continue to transmit uplink signals using the UE beam 210-*a* until a gap between transmissions is greater than the beam switching gap, at which point the UE 115-*a* may switch to using the UE beam 210-*b*. In some examples, the UE 115-*a* may discard the indication of the switch to using the UE beam 210-*b* if a timer expires before a beam switching gap is available.

In a second example, the UE 115-*a* may shorten the first uplink signal or the second uplink signal (or both) to accommodate the beam switching gap. For example, if the first uplink signal includes a set of repetitions of a PUCCH or PUSCH transmission, the UE 115-*a* may refrain from transmitting repetitions at the end of the first uplink signal to accommodate the beam switching gap before the beginning of the second uplink signal. Similarly, if the second uplink signal includes a set of repetitions of a PUCCH or PUSCH transmission, the UE 115-*a* may refrain from transmitting repetitions at the beginning of the second uplink signal to accommodate the beam switching gap. In some examples, the base station 105-*a* may configure the UE 115-*a* with a duration (e.g., a symbol or a portion of a symbol) that may be discarded from uplink signals to accommodate the beam switching gap.

Figure 3:
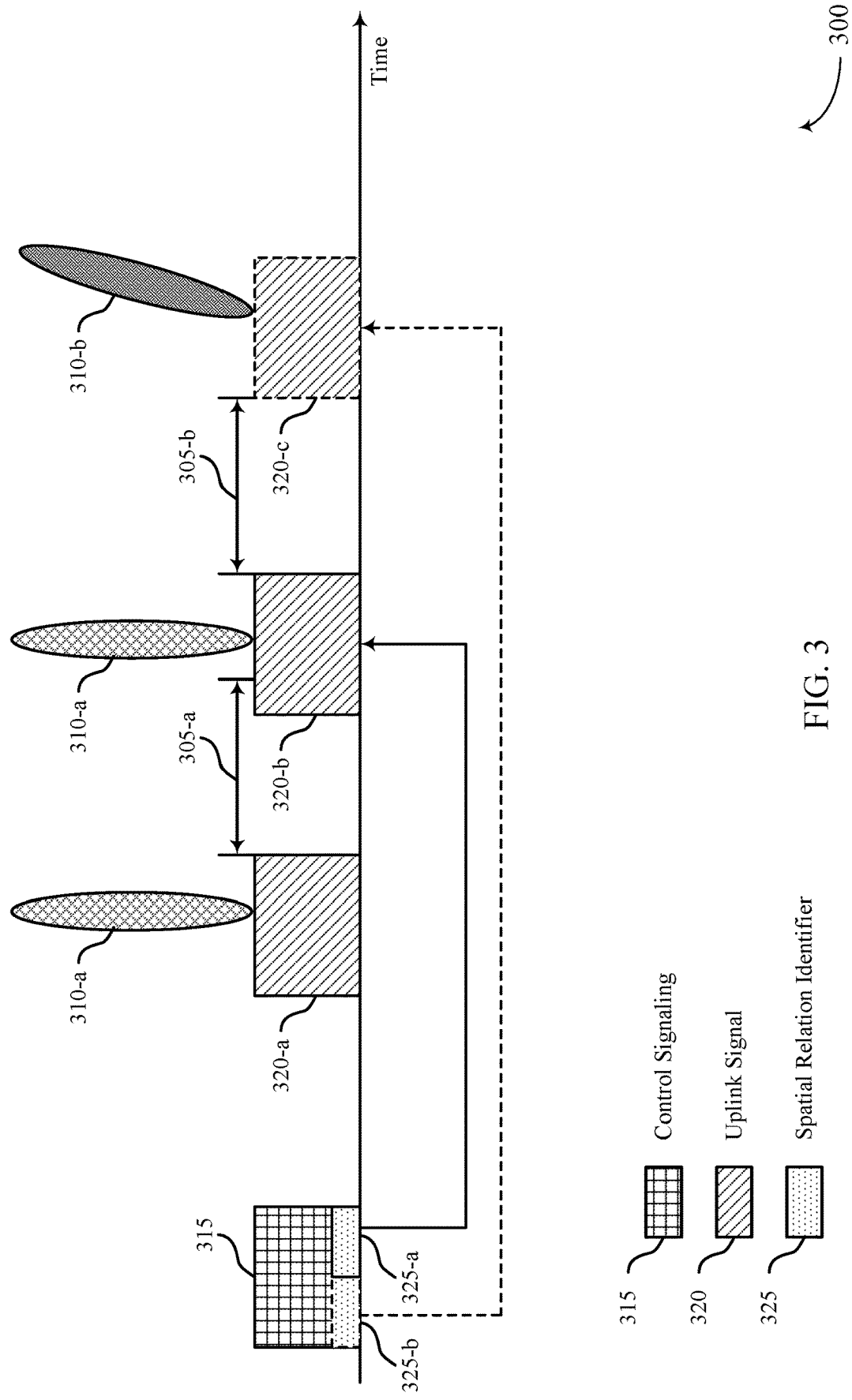
FIG. 3 illustrates an example of a transmission scheme that supports techniques for modifying a spatial relationship of an uplink channel in accordance with aspects of the present disclosure.

FIG. 3 illustrates an example of a transmission scheme 300 that supports techniques for modifying a spatial relationship of an uplink channel in accordance with aspects of the present disclosure. In some examples, the transmission scheme 300 may implement aspects of the wireless communications system 100 or the wireless communications system 200. For example, the transmission scheme 300 may illustrate communication between devices in a wireless communications system, each of which may be an example of a UE 115 or a base station 105 described with reference to FIGS. 1 and 2. The transmission scheme 300 may include features for improved communication reliability, among other benefits.

As described herein, a UE and a base station may adjust one or more uplink signals 320 (e.g., PUCCH or PUSCH transmissions) based on a beam switching gap 305. In some examples, the base station may configure the UE with a beam switching gap 305 (e.g., 100 ns), during which the UE may adjust one or more antennas to use a beam 310 to transmit an uplink signal 320 as indicated by the base station, for example in control signaling 315 (e.g., a MAC-CE). For example, the control signaling 315 may include a spatial relation identifier 325-*a* indicating the UE is to use a beam 310-*b* to transmit an uplink signal 320-*b*. The UE may be configured to transmit an uplink signal 320-*a* using a beam 310-*a* before transmitting the uplink signal 320-*b*. In some examples, the uplink signal 320-*b* may be scheduled within a beam switching gap 305-*a* following the uplink signal 320-*a*, and the UE may not have time to switch to the beam 310-*b* between the uplink signals 320-*a* and 320-*b*. Based on the scheduled uplink signals 320, the UE may transmit the uplink signal 320-*b* using the beam 310-*a*, rather than switching to using the beam 310-*b*. The UE may determine to use the beam 310-*a* without additional signaling from the base station, which may reduce overhead and improve signaling efficiency. In some examples, the base station may indicate rules for beam switching according to the techniques described herein in prior control signaling, for example in an RRC message.

In some examples, if multiple uplink signals 320 are scheduled to use the beam 310-*b*, the UE may continue to transmit uplink signals 320 using the beam 310-*a* until a gap between uplink signals 320 is greater than the beam switching gap 305, at which point the UE may switch to using the beam 310-*b*. For example, the control signaling 315 may further include a spatial relation identifier 325-*b* indicating the UE is to use the beam 310-*b* to transmit an uplink signal 320-*c*. A gap between the uplink signal 320-*b* and the uplink signal 320-*c* may be greater than a beam switching gap 305-*b*, and accordingly the UE may adjust one or more antennas during the beam switching gap 305-*b* to use the beam 310-*b* to transmit the uplink signal 320-*c*.

Additionally or alternatively, if the UE is unable to switch to using the beam 310-*b*, the base station may transmit signaling to cancel an allocation for an uplink signal 320. For example, the base station may determine it is preferable to cancel or alter the uplink signal 320-*b* rather than allow the UE to transmit using the beam 310-*a*. In some examples, the uplink signal 320-*b* may include redundant or less useful information. Accordingly, the base station may, using additional control signaling, cancel transmission of the uplink signal 320-*b* or schedule an alternative transmission in place of the uplink signal 320-*b*.

Figure 4A:
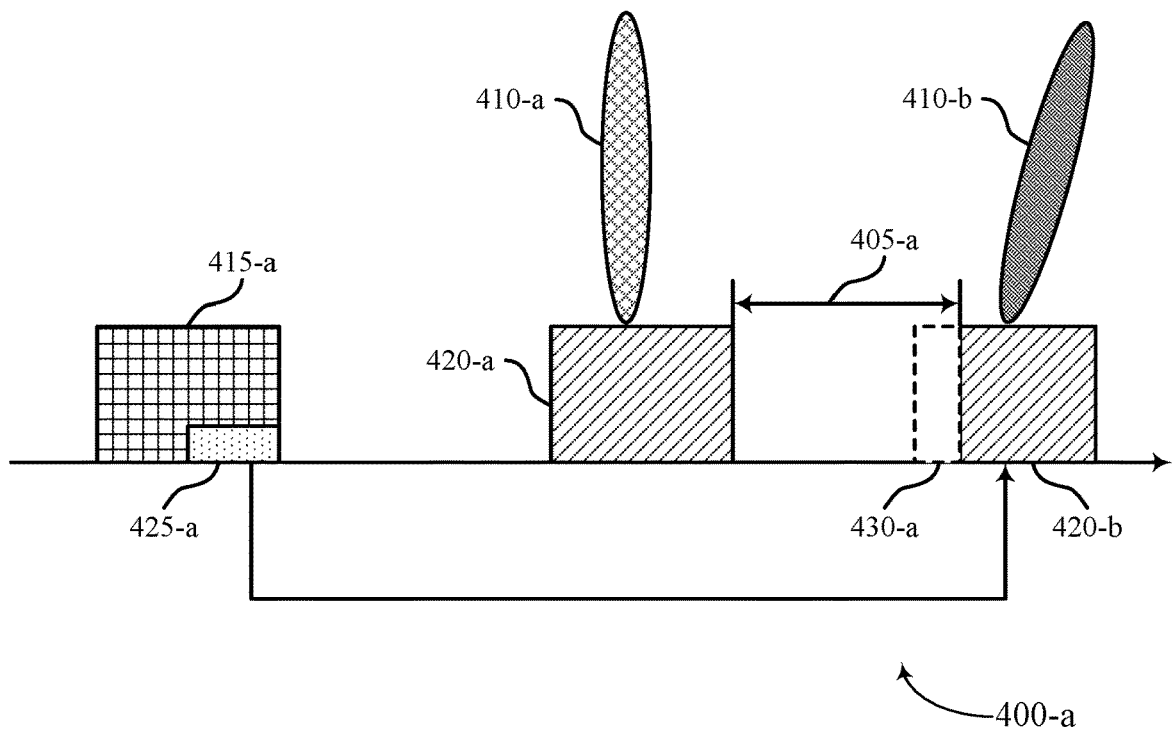
FIGS. 4A and 4B illustrate examples of transmission schemes that support techniques for modifying a spatial relationship of an uplink channel in accordance with aspects of the present disclosure.
Figure 4B:
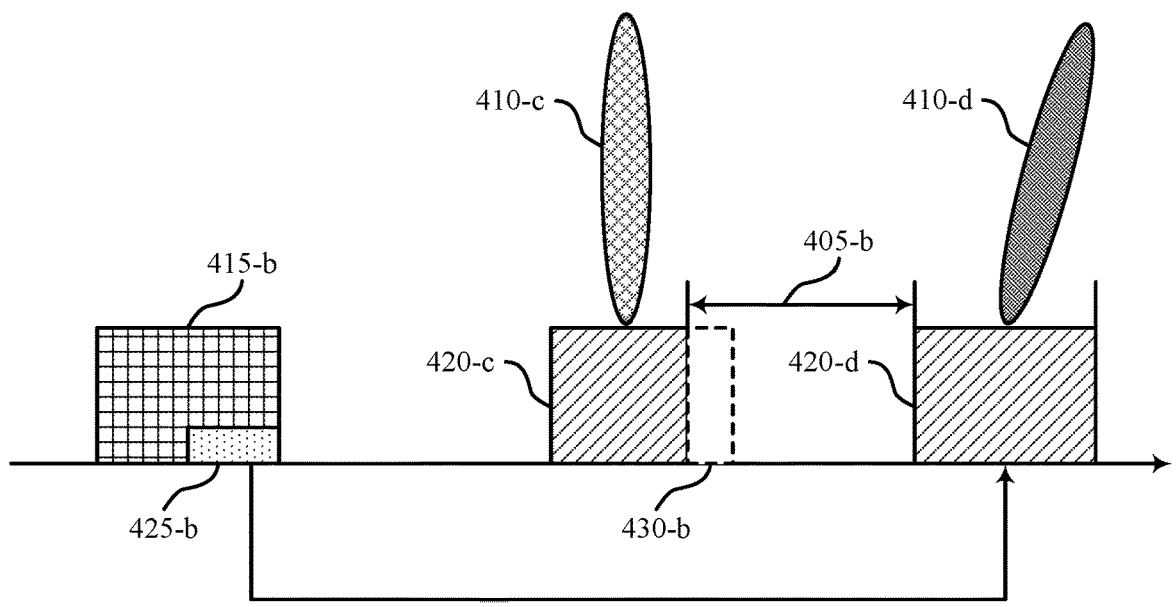

FIGS. 4A and 4B illustrate examples of transmission schemes 400 that support techniques for modifying a spatial relationship of an uplink channel in accordance with aspects of the present disclosure. In some examples, the transmission scheme 400 may implement aspects of the wireless communications system 100 or the wireless communications system 200. For example, the transmission scheme 400 may illustrate communication between devices in a wireless communications system, each of which may be an example of a UE 115 or a base station 105 described with reference to FIGS. 1 and 2. The transmission scheme 400 may include features for improved communication reliability, among other benefits.

A UE and a base station may adjust one or more uplink signals 420 (e.g., PUCCH or PUSCH transmissions) based on a beam switching gap 405. In some examples, the base station may configure the UE with a beam switching gap 405 of 100 ns, during which the UE may adjust one or more antennas to use a beam 410 to transmit an uplink signal 420 as indicated by the base station, for example in control signaling 415 (e.g., a MAC-CE). For example, the control signaling 415 may include a spatial relation identifier 425 indicating the UE is to use a second beam 410 to transmit a first uplink signal 420. The UE may be configured to transmit a first uplink signal 420 using a first beam 410 before transmitting the second uplink signal 420. In some examples, the second uplink signal 420 may be scheduled within a beam switching gap 405 following the first uplink signal 420, and the UE may not have time to switch to the second beam 410 between the first and second uplink signals 420. In some examples, the base station may indicate rules for beam switching according to the techniques described herein in prior control signaling, for example in an RRC message.

In a transmission scheme 400-a as illustrated in FIG. 4A, the UE may shorten an uplink signal 420-b to accommodate a beam switching gap 405-a between an uplink signal 420-a and the uplink signal 420-b. For example, if the uplink signal 420-b includes a set of repetitions of a PUCCH or PUSCH transmission, the UE may refrain from transmitting repetitions in a portion 430-a at the beginning of the uplink signal 420-b to accommodate the beam switching gap 405-a. In some examples, the base station may configure the UE with a duration (e.g., a symbol or a portion of a symbol) of the portion 430-a that may be discarded from the uplink signal 420-b to accommodate the beam switching gap 405-a.

Additionally or alternatively, in a transmission scheme 400-b as illustrated in FIG. 4B, the UE may shorten an uplink signal 420-c to accommodate a beam switching gap 405-b between the uplink signal 420-c and an uplink signal 420-d. For example, if the uplink signal 420-c includes a set of repetitions of a PUCCH or PUSCH transmission, the UE may refrain from transmitting repetitions in a portion 430-b at the end of the uplink signal 420-c to accommodate the beam switching gap 405-b before the beginning of the uplink signal 420-d. In some examples, the base station may configure the UE with a duration (e.g., a symbol or a portion of a symbol) of the portion 430-b that may be discarded from the uplink signal 420-c to accommodate the beam switching gap 405-b.

Figure 5:
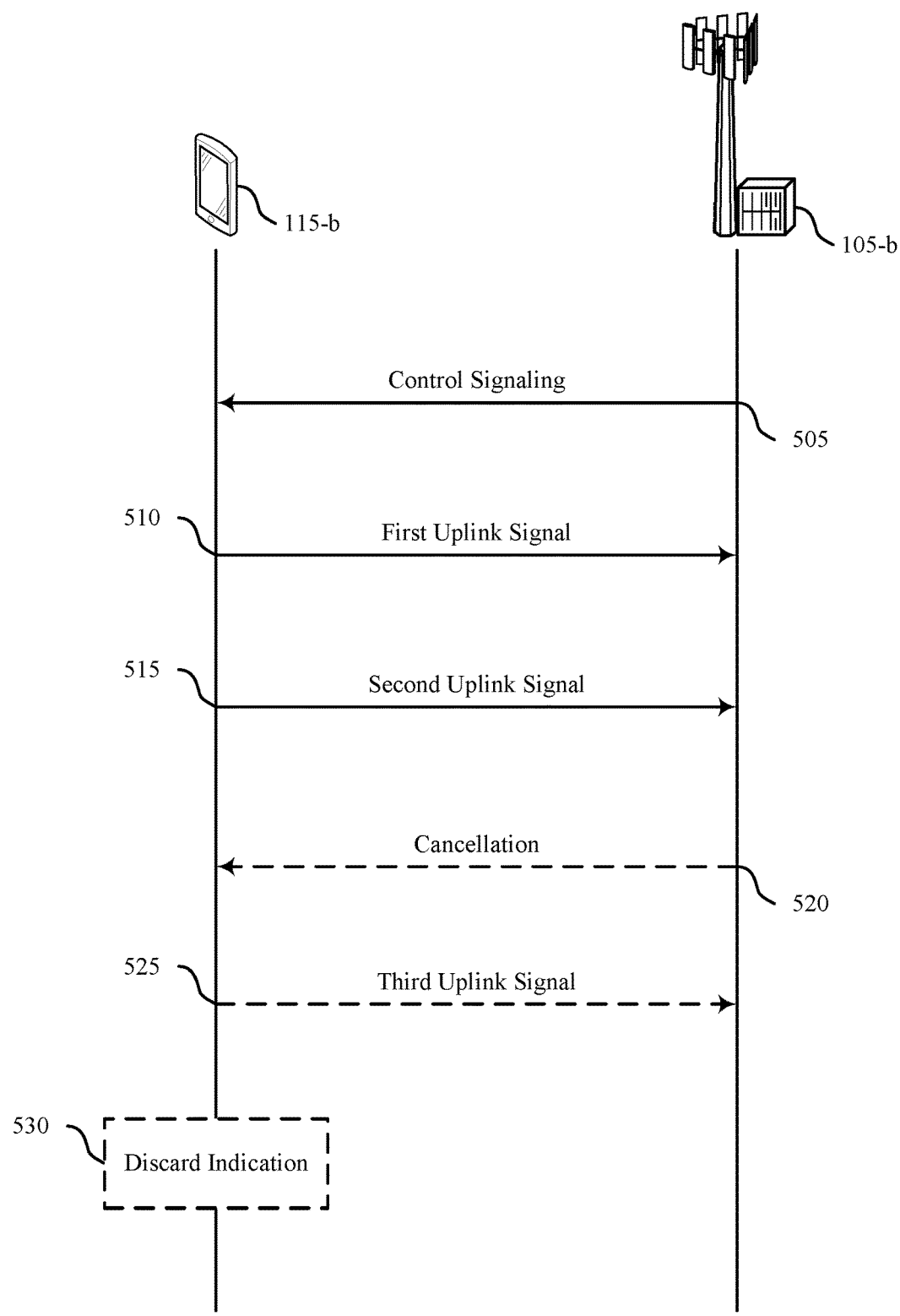
FIG. 5 illustrates an example of a process flow that supports techniques for modifying a spatial relationship of an uplink channel in accordance with aspects of the present disclosure.

FIG. 5 illustrates an example of a process flow 500 that supports techniques for modifying a spatial relationship of an uplink channel in accordance with aspects of the present disclosure. In some examples, the process flow 500 may implement aspects of wireless communications systems 100 and 200. For example, the process flow 500 may include example operations associated with one or more of a base station 105-b or a UE 115-b, which may be examples of the corresponding devices described with reference to FIGS. 1 and 2. In the following description of the process flow 500, the operations between the base station 105-b and the UE 115-b may be performed in a different order than the example order shown, or the operations performed by the base station 105-b and the UE 115-b may be performed in different orders or at different times. Some operations may also be omitted from the process flow 500, and other operations may be added to the process flow 500. The operations performed by the base station 105-b and the UE 115-b may support improvement to the UE 115-b network access operations and, in some examples, may promote improvements to efficiency and reliability for communications between the base station 105-b and the UE 115-b, among other benefits.

At 505, the base station 105-b may transmit control signaling to the UE 115-b. The control signaling may indicate, based on changes in channel conditions, scheduling factors, or other considerations, a second spatial relation parameter to be used for transmission of a second uplink signal after transmission of a first uplink signal using the first spatial relation parameter. In some examples, the base station 105-b may configure the UE 115-b with a beam switching gap (e.g., 100 ns), during which the UE 115-b may adjust one or more antennas based on an indicated spatial relation parameter to use a beam to transmit an uplink signal as indicated by the base station 105-b. For example, the base station 105-b may specify one or more spatial relationships for uplink transmissions, as well as rules for beam switching. Subsequently, the base station 105-b may transmit the control signaling to activate one of the spatial relationships. In some examples, the control signaling may be a MAC-CE.

At 510, the UE 115-b may transmit the first uplink signal using the first spatial relation parameter (e.g., the first beam). At 515, the UE 115-b may transmit the second uplink signal using the first spatial relation parameter (e.g., the first beam). In some examples, the second uplink signal may be scheduled within a beam switching gap following the first uplink signal, and the UE 115-b may not have time to switch to the beam between the uplink signals. Based on the scheduled uplink signals, the UE 115-b may transmit the second uplink signal using the first beam, rather than switching to using the second beam, as indicated in the control signaling. The UE 115-b may determine to use the first beam without additional signaling from the base station 105-b, which may reduce overhead and improve signaling efficiency.

In some examples, at 520, the base station 105-b may transmit signaling to cancel an allocation for a subsequent uplink signal, for example if the UE 115-b is unable to switch to using the second spatial relation parameter. Additionally or alternatively, if multiple uplink signals are scheduled to use the second spatial relation parameter, the UE 115-b may continue to transmit uplink signals using the first spatial relation parameter until a gap between uplink signals is greater than the beam switching gap, at which point the UE 115-b may switch to using the beam. For example, the control signaling may further include a spatial relation identifier indicating the UE 115-b is to use the second spatial relation parameter to transmit a third uplink signal. In some examples, a gap between a previous uplink signal and the third uplink signal may be greater than a beam switching gap, and at 525 the UE 115-b may adjust one or more antennas during the beam switching gap to use the second beam to transmit the third uplink signal. Alternatively, the gap between the previous uplink signal and the third uplink signal may be less than the beam switching gap, and at 525 the UE 115-b may transmit the third uplink signal using the first beam.

In some examples, at 530, the UE 115-b may discard the indication received in the control signaling, for example if a timer expires before a beam switching gap is available. By implementing one or more of the described techniques for uplink transmission scheduling, the UE 115-b and the base station 105-b may be able to communicate more reliably, among other benefits.

Figure 6:
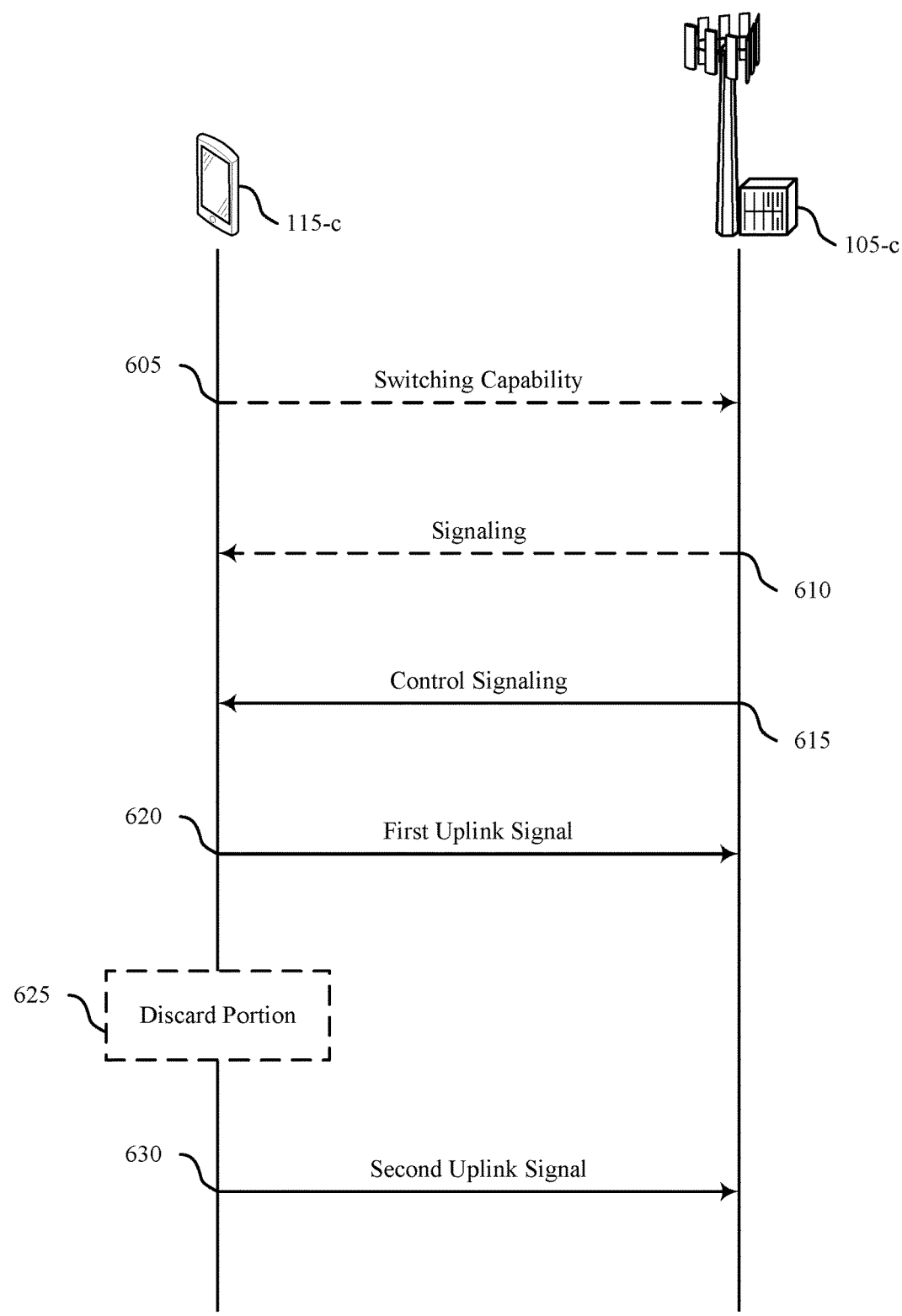
FIG. 6 illustrates an example of a process flow that supports techniques for modifying a spatial relationship of an uplink channel in accordance with aspects of the present disclosure.

FIG. 6 illustrates an example of a process flow 600 that supports techniques for modifying a spatial relationship of an uplink channel in accordance with aspects of the present disclosure. In some examples, the process flow 600 may implement aspects of wireless communications systems 100 and 200. For example, the process flow 600 may include example operations associated with one or more of a base station 105-c or a UE 115-c, which may be examples of the corresponding devices described with reference to FIGS. 1 and 2. In the following description of the process flow 600, the operations between the base station 105-c and the UE 115-c may be performed in a different order than the example order shown, or the operations performed by the base station 105-c and the UE 115-c may be performed in different orders or at different times. Some operations may also be omitted from the process flow 600, and other operations may be added to the process flow 600. The operations performed by the base station 105-c and the UE 115-c may support improvement to the UE 115-c network access operations and, in some examples, may promote improvements to efficiency and reliability for communications between the base station 105-c and the UE 115-c, among other benefits.

In some examples, at 605 the UE 115-c may indicate a switching capability to the base station 105-c. In response, at 610 the base station 105-c may transmit signaling to the UE 115-c. In some examples, the signaling may configure the UE 115-c with a beam switching gap (e.g., 100 ns), during which the UE 115-c may adjust one or more antennas based on an indicated spatial relation parameter to use a beam to transmit an uplink signal as indicated by the base station 105-c. Additionally or alternatively, the signaling may configure the UE 115-c with a duration (e.g., a symbol or a portion of a symbol) of a portion that may be discarded from an uplink signal to accommodate the beam switching gap.

At 615, the base station 105-c may transmit control signaling to the UE 115-c. The control signaling may indicate, based on changes in channel conditions, scheduling factors, or other considerations, a second spatial relation parameter to be used for transmission of a second uplink signal after transmission of a first uplink signal using the first spatial relation parameter. For example, the base station 105-c may specify one or more spatial relationships for uplink transmissions, as well as rules for beam switching. Subsequently, the base station 105-c may transmit the control signaling to activate one of the spatial relationships. In some examples, the control signaling may be a MAC-CE.

At 620, the UE 115-c may transmit a portion of the first uplink signal using the first spatial relation parameter (e.g., the first beam). In some examples, at 625, the UE may discard a portion to shorten the first uplink signal or the second uplink signal (or both) to accommodate the beam switching gap. For example, if the first uplink signal includes a set of repetitions of a PUCCH or PUSCH transmission, the UE 115-c may refrain from transmitting repetitions at the end of the first uplink signal to accommodate the beam switching gap before the beginning of the second uplink signal. Similarly, if the second uplink signal includes a set of repetitions of a PUCCH or PUSCH transmission, the UE 115-c may refrain from transmitting repetitions at the beginning of the second uplink signal to accommodate the beam switching gap. In some examples, the UE 115-c may discard the portion based on the signaling from the base station 105-c.

At 630, the UE may transmit a portion of the second uplink signal using the second spatial relation parameter (e.g., the second beam). By implementing one or more of the described techniques for uplink transmission scheduling, the UE 115-c and the base station 105-c may be able to communicate more reliably, among other benefits.

Figure 7:
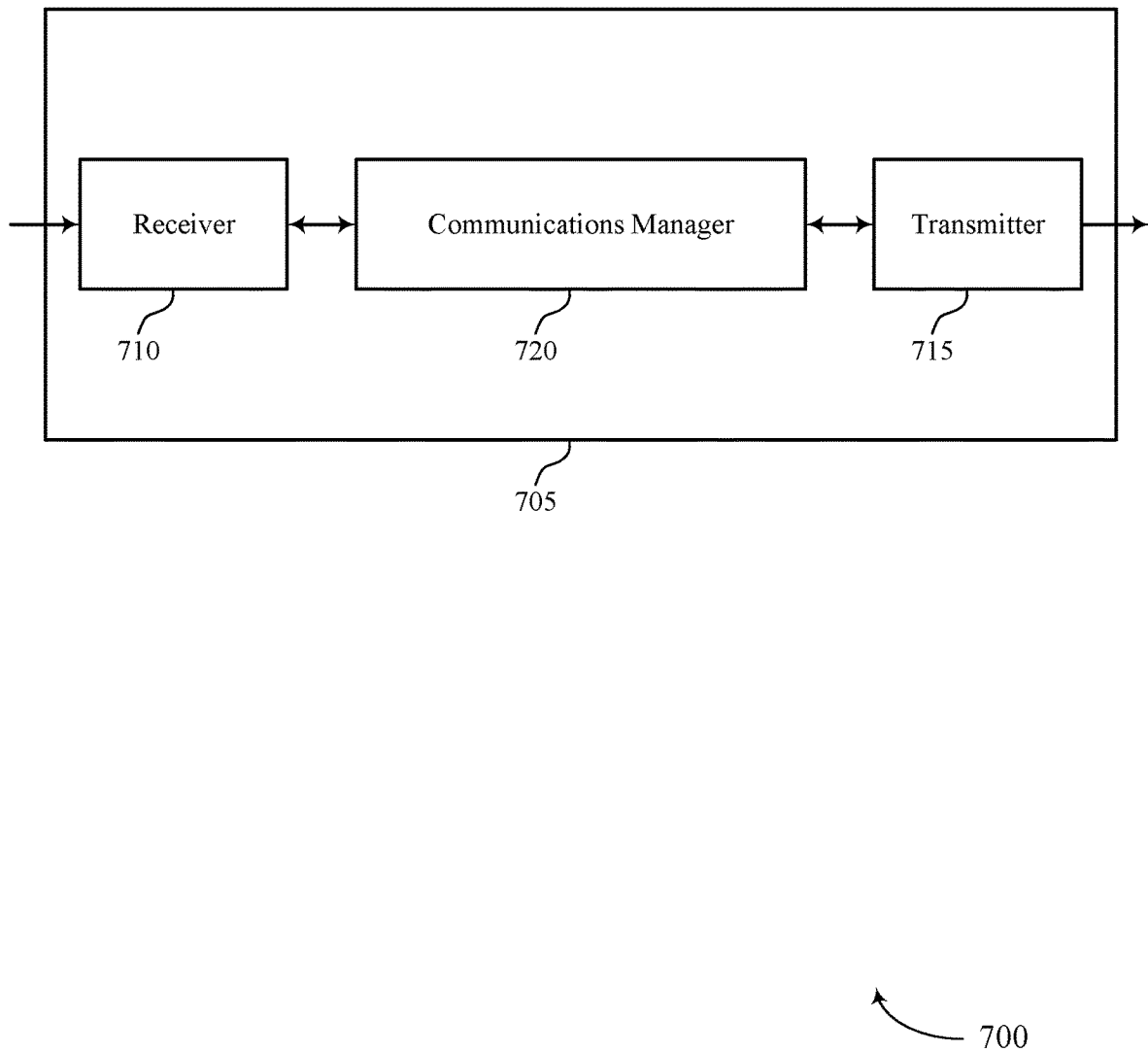
FIGS. 7 and 8 show block diagrams of devices that support techniques for modifying a spatial relationship of an uplink channel in accordance with aspects of the present disclosure.

FIG. 7 shows a block diagram 700 of a device 705 that supports techniques for modifying a spatial relationship of an uplink channel in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for modifying a spatial relationship of an uplink channel). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for modifying a spatial relationship of an uplink channel). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for modifying a spatial relationship of an uplink channel as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The communications manager 720 may be configured as or otherwise support a means for transmitting the first uplink signal using the first spatial relation parameter. The communications manager 720 may be configured as or otherwise support a means for transmitting, in response to receiving the control signaling, the second uplink signal using the first spatial relation parameter based on a size of a switch duration associated with using the second spatial relation parameter after using the first spatial relation parameter.

Additionally or alternatively, the communications manager 720 may support wireless communication at a UE in accordance with examples as disclosed herein. For example, the communications manager 720 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The communications manager 720 may be configured as or otherwise support a means for transmitting a first portion of the first uplink signal using the first spatial relation parameter based on a size of a switch duration associated with using the second spatial relation parameter after using the first spatial relation parameter. The communications manager 720 may be configured as or otherwise support a means for transmitting, in response to receiving the control signaling, a second portion of the second uplink signal using the second spatial relation parameter based on the size of the switch duration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more consistent beam service, faster and more accurate reaction to varying wireless conditions, and a more efficient utilization of communication resources.

Figure 8:
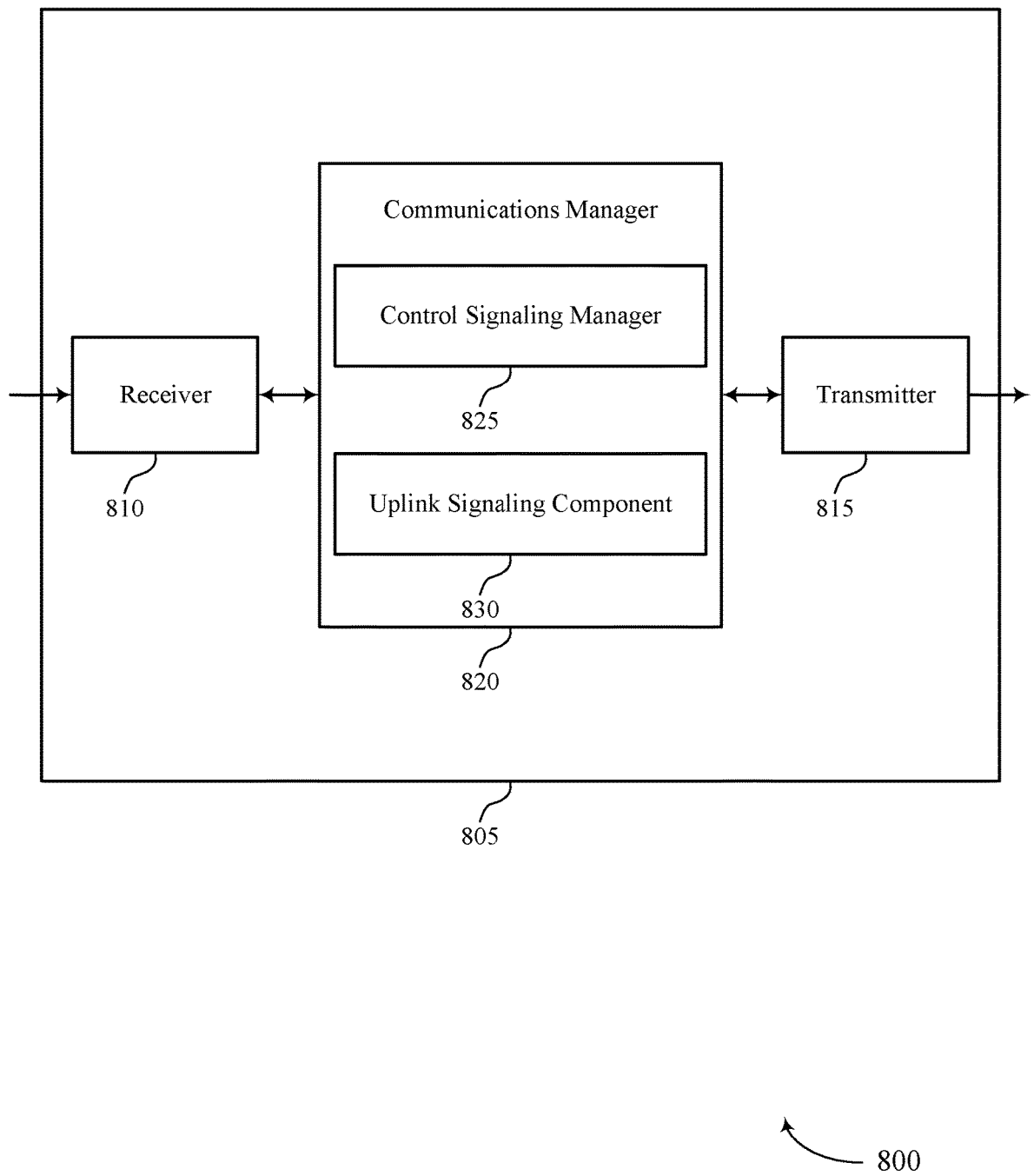

FIG. 8 shows a block diagram 800 of a device 805 that supports techniques for modifying a spatial relationship of an uplink channel in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for modifying a spatial relationship of an uplink channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for modifying a spatial relationship of an uplink channel). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for modifying a spatial relationship of an uplink channel as described herein. For example, the communications manager 820 may include a control signaling manager 825 an uplink signaling component 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control signaling manager 825 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The uplink signaling component 830 may be configured as or otherwise support a means for transmitting the first uplink signal using the first spatial relation parameter. The uplink signaling component 830 may be configured as or otherwise support a means for transmitting, in response to receiving the control signaling, the second uplink signal using the first spatial relation parameter based on a size of a switch duration associated with using the second spatial relation parameter after using the first spatial relation parameter.

Additionally or alternatively, the communications manager 820 may support wireless communication at a UE in accordance with examples as disclosed herein. The control signaling manager 825 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The uplink signaling component 830 may be configured as or otherwise support a means for transmitting a first portion of the first uplink signal using the first spatial relation parameter based on a size of a switch duration associated with using the second spatial relation parameter after using the first spatial relation parameter. The uplink signaling component 830 may be configured as or otherwise support a means for transmitting, in response to receiving the control signaling, a second portion of the second uplink signal using the second spatial relation parameter based on the size of the switch duration.

Figure 9:
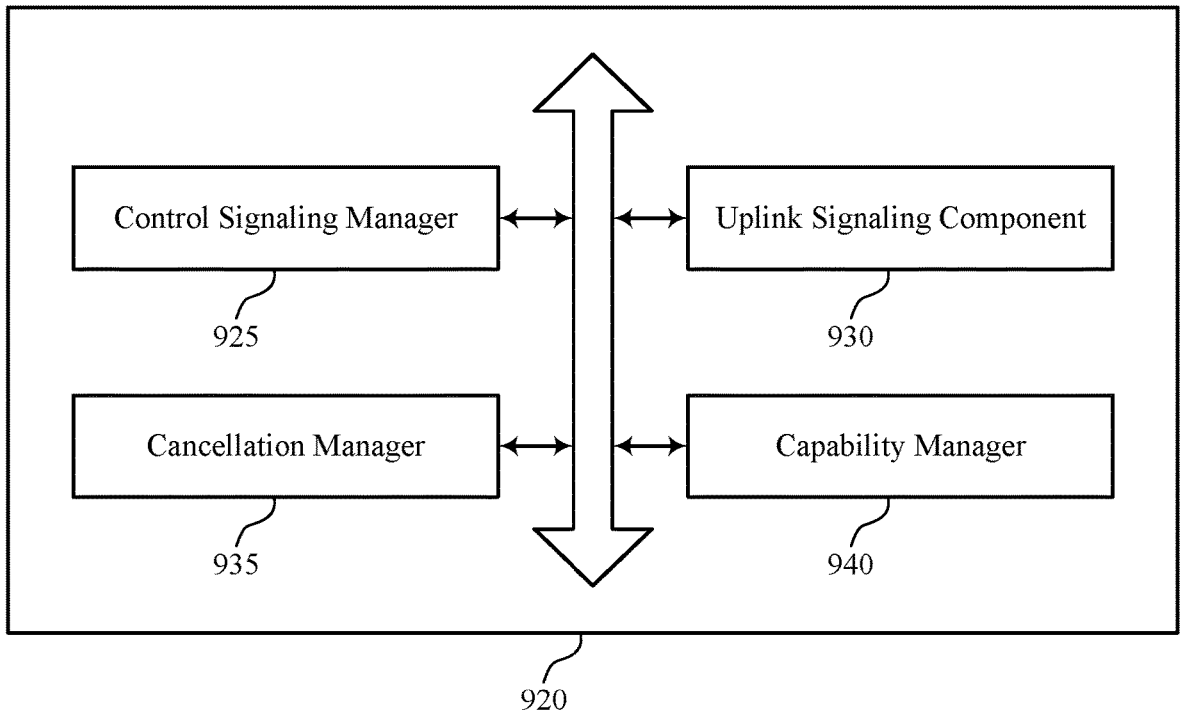
FIG. 9 shows a block diagram of a communications manager that supports techniques for modifying a spatial relationship of an uplink channel in accordance with aspects of the present disclosure.

FIG. 9 shows a block diagram 900 of a communications manager 920 that supports techniques for modifying a spatial relationship of an uplink channel in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for modifying a spatial relationship of an uplink channel as described herein. For example, the communications manager 920 may include a control signaling manager 925, an uplink signaling component 930, a cancellation manager 935, a capability manager 940, or any combination thereof. Each of these components may communicate, directly or indirectly, with one another (e.g., via one or more buses).

The communications manager 920 may support wireless communication at a UE in accordance with examples as disclosed herein. The control signaling manager 925 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The uplink signaling component 930 may be configured as or otherwise support a means for transmitting the first uplink signal using the first spatial relation parameter. In some examples, the uplink signaling component 930 may be configured as or otherwise support a means for transmitting, in response to receiving the control signaling, the second uplink signal using the first spatial relation parameter based on a size of a switch duration associated with using the second spatial relation parameter after using the first spatial relation parameter.

In some examples, the uplink signaling component 930 may be configured as or otherwise support a means for transmitting, in response to receiving the control signaling, a third uplink signal using the second spatial relation parameter based on the size of the switch duration, where the control signaling further indicates the second spatial relation parameter is to be used for transmission of the third uplink signal.

In some examples, a first size of a first duration between a first allocation associated with the first uplink signal and a second allocation associated with the second uplink signal is less than the size of the switch duration. In some examples, a second size of a second duration between the second allocation associated with the second uplink signal and a third allocation associated with the third uplink signal is greater than the size of the switch duration.

In some examples, the uplink signaling component 930 may be configured as or otherwise support a means for transmitting, in response to receiving the control signaling, a third uplink signal using the first spatial relation parameter based on the size of the switch duration, where the control signaling indicates the second spatial relation parameter is to be used for transmission of the third uplink signal.

In some examples, a first size of a first duration between a first allocation associated with the first uplink signal and a second allocation associated with the second uplink signal is less than the size of the switch duration. In some examples, a second size of a second duration between the second allocation associated with the second uplink signal and a third allocation associated with the third uplink signal is less than the size of the switch duration.

In some examples, the cancellation manager 935 may be configured as or otherwise support a means for receiving signaling indicating a cancellation of a third uplink signal based on based on the size of the switch duration.

In some examples, the control signaling manager 925 may be configured as or otherwise support a means for discarding the indication of the second spatial parameter based on an expiration of a timer associated with the control signaling.

In some examples, the control signaling includes a serving cell identifier, a bandwidth part identifier, a resource identifier associated with the second uplink signal, one or more bits indicating the second spatial parameter, one or more reserved bits, or any combination thereof.

In some examples, the control signaling includes a downlink control information message or a MAC-CE.

In some examples, the first uplink signal includes a first PUSCH, a first PUCCH, or both. In some examples, the second uplink signal includes a second PUSCH, a second PUCCH, or both.

Additionally or alternatively, the communications manager 920 may support wireless communication at a UE in accordance with examples as disclosed herein. In some examples, the control signaling manager 925 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. In some examples, the uplink signaling component 930 may be configured as or otherwise support a means for transmitting a first portion of the first uplink signal using the first spatial relation parameter based on a size of a switch duration associated with using the second spatial relation parameter after using the first spatial relation parameter. In some examples, the uplink signaling component 930 may be configured as or otherwise support a means for transmitting, in response to receiving the control signaling, a second portion of the second uplink signal using the second spatial relation parameter based on the size of the switch duration.

In some examples, the uplink signaling component 930 may be configured as or otherwise support a means for discarding a third portion of the first uplink signal based on the size of the switch duration, where the first uplink signal includes the first portion and the third portion.

In some examples, the uplink signaling component 930 may be configured as or otherwise support a means for discarding a third portion of the second uplink signal based on the size of the switch duration, where the second uplink signal includes the second portion and the third portion.

In some examples, the control signaling manager 925 may be configured as or otherwise support a means for receiving signaling indicating a third portion to be discarded based on the size of the switch duration, where the first uplink signal or the second uplink signal includes the third portion.

In some examples, the capability manager 940 may be configured as or otherwise support a means for transmitting signaling indicating a switching capability of the UE, where the signaling indicating the third portion is received in response to the signaling indicating the switching capability.

In some examples, the first portion of the first uplink signal and the second portion of the second uplink signal are transmitted in response to receiving the signaling indicating the third portion.

In some examples, the third portion includes a symbol or a portion of a symbol.

In some examples, the control signaling includes a serving cell identifier, a bandwidth part identifier, a resource identifier associated with the second uplink signal, one or more bits indicating the second spatial parameter, one or more reserved bits, or any combination thereof.

In some examples, the control signaling includes a downlink control information message or a MAC-CE.

In some examples, the first uplink signal includes a first PUSCH, a first PUCCH, or both. In some examples, the second uplink signal includes a second PUSCH, a second PUCCH, or both.

Figure 10:
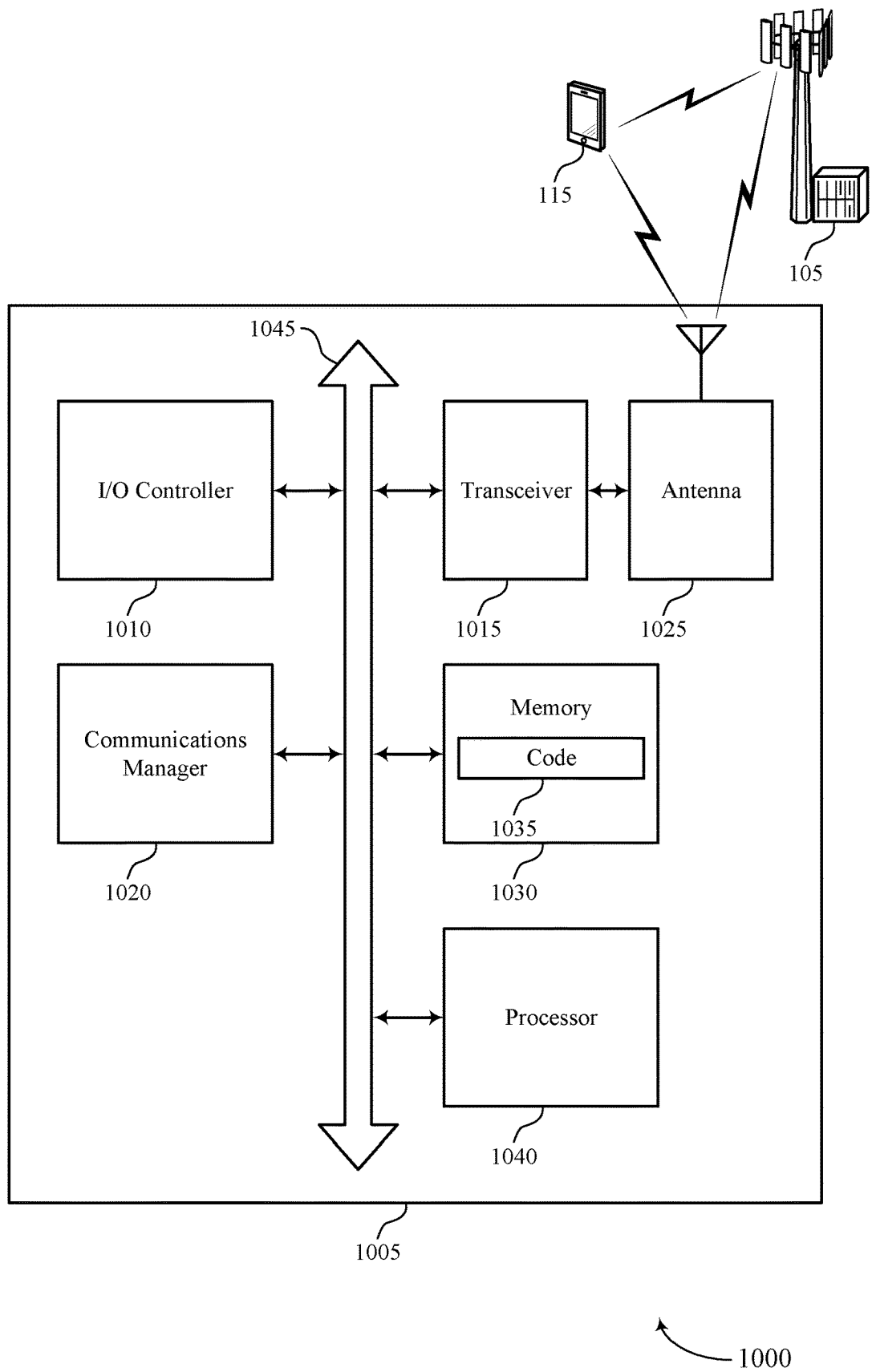
FIG. 10 shows a diagram of a system including a device that supports techniques for modifying a spatial relationship of an uplink channel in accordance with aspects of the present disclosure.

FIG. 10 shows a diagram of a system 1000 including a device 1005 that supports techniques for modifying a spatial relationship of an uplink channel in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for modifying a spatial relationship of an uplink channel). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The communications manager 1020 may be configured as or otherwise support a means for transmitting the first uplink signal using the first spatial relation parameter. The communications manager 1020 may be configured as or otherwise support a means for transmitting, in response to receiving the control signaling, the second uplink signal using the first spatial relation parameter based on a size of a switch duration associated with using the second spatial relation parameter after using the first spatial relation parameter.

Additionally or alternatively, the communications manager 1020 may support wireless communication at a UE in accordance with examples as disclosed herein. For example, the communications manager 1020 may be configured as or otherwise support a means for receiving control signaling indicating a second spatial relation parameter different from a first spatial relation parameter, the second spatial relation parameter to be used for transmission of a second uplink signal after transmission of a first uplink signal using the first spatial relation parameter. The communications manager 1020 may be configured as or otherwise support a means for transmitting a first portion of the first uplink signal using the first spatial relation parameter based on a size of a switch duration associated with using the second spatial relation parameter after using the first spatial relation parameter. The communications manager 1020 may be configured as or otherwise support a means for transmitting, in response to receiving the control signaling, a second portion of the second uplink signal using the second spatial relation parameter based on the size of the switch duration.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or more consistent beam service.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for modifying a spatial relationship of an uplink channel as described herein, or the processor 1040 and the memory 1030 may be otherwise configured to perform or support such operations.

Figure 11:
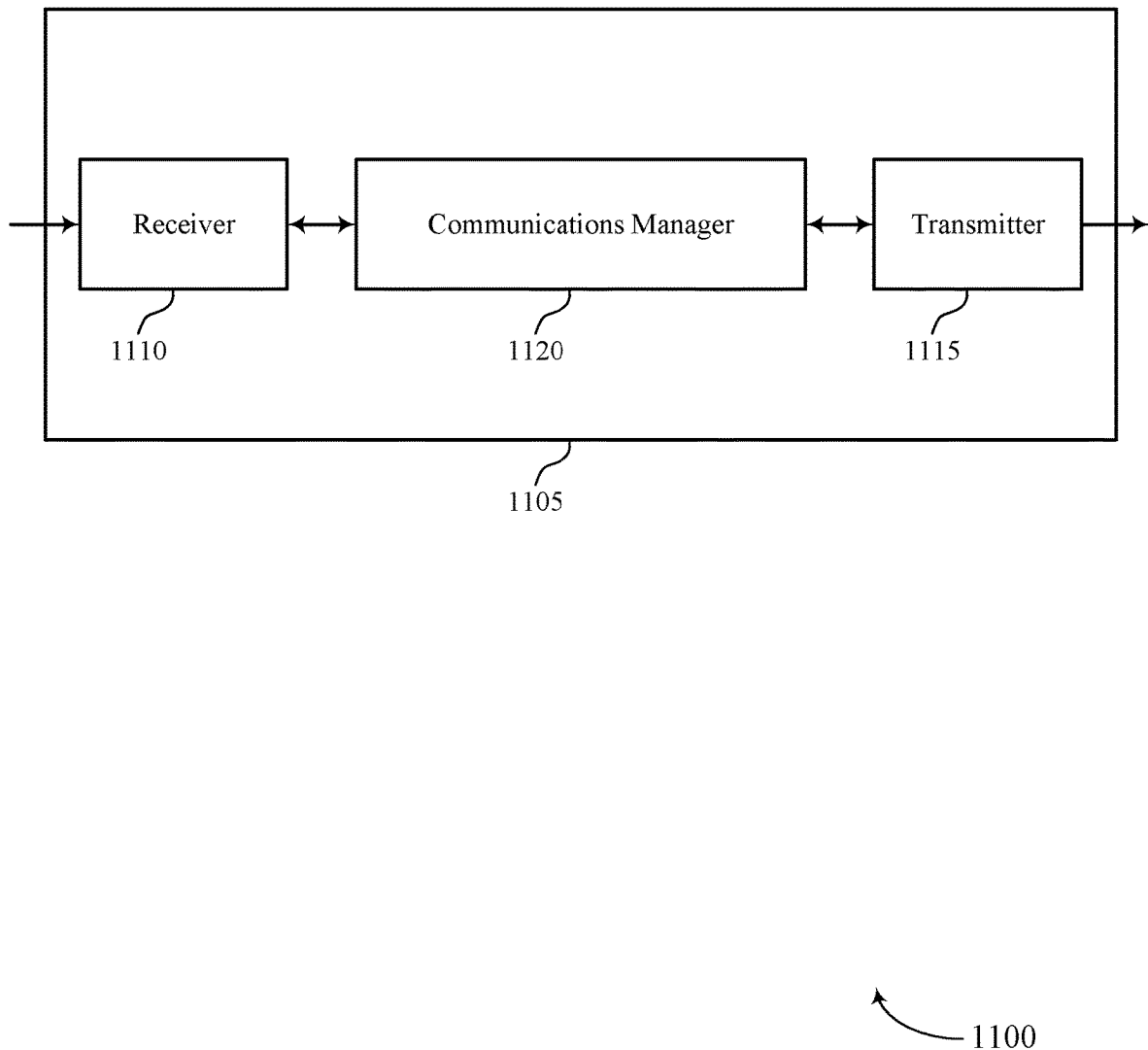
FIGS. 11 and 12 show block diagrams of devices that support techniques for modifying a spatial relationship of an uplink channel in accordance with aspects of the present disclosure.

FIG. 11 shows a block diagram 1100 of a device 1105 that supports techniques for modifying a spatial relationship of an uplink channel in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for modifying a spatial relationship of an uplink channel). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for modifying a spatial relationship of an uplink channel). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for modifying a spatial relationship of an uplink channel as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The communications manager 1120 may be configured as or otherwise support a means for receiving the first uplink signal in accordance with the first spatial relation parameter. The communications manager 1120 may be configured as or otherwise support a means for receiving, in response to transmitting the control signaling, the second uplink signal in accordance with the first spatial relation parameter based on a size of a switch duration associated with using the second spatial relation parameter after using the first spatial relation parameter.

Additionally or alternatively, the communications manager 1120 may support wireless communication at a base station in accordance with examples as disclosed herein. For example, the communications manager 1120 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The communications manager 1120 may be configured as or otherwise support a means for receiving a first portion of the first uplink signal in accordance with the first spatial relation parameter based on a size of a switch duration associated with using the second spatial relation parameter after using the first spatial relation parameter. The communications manager 1120 may be configured as or otherwise support a means for receiving, in response to transmitting the control signaling, a second portion of the second uplink signal in accordance with the second spatial relation parameter.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more consistent beam service, faster and more accurate reaction to varying wireless conditions, and a more efficient utilization of communication resources.

Figure 12:
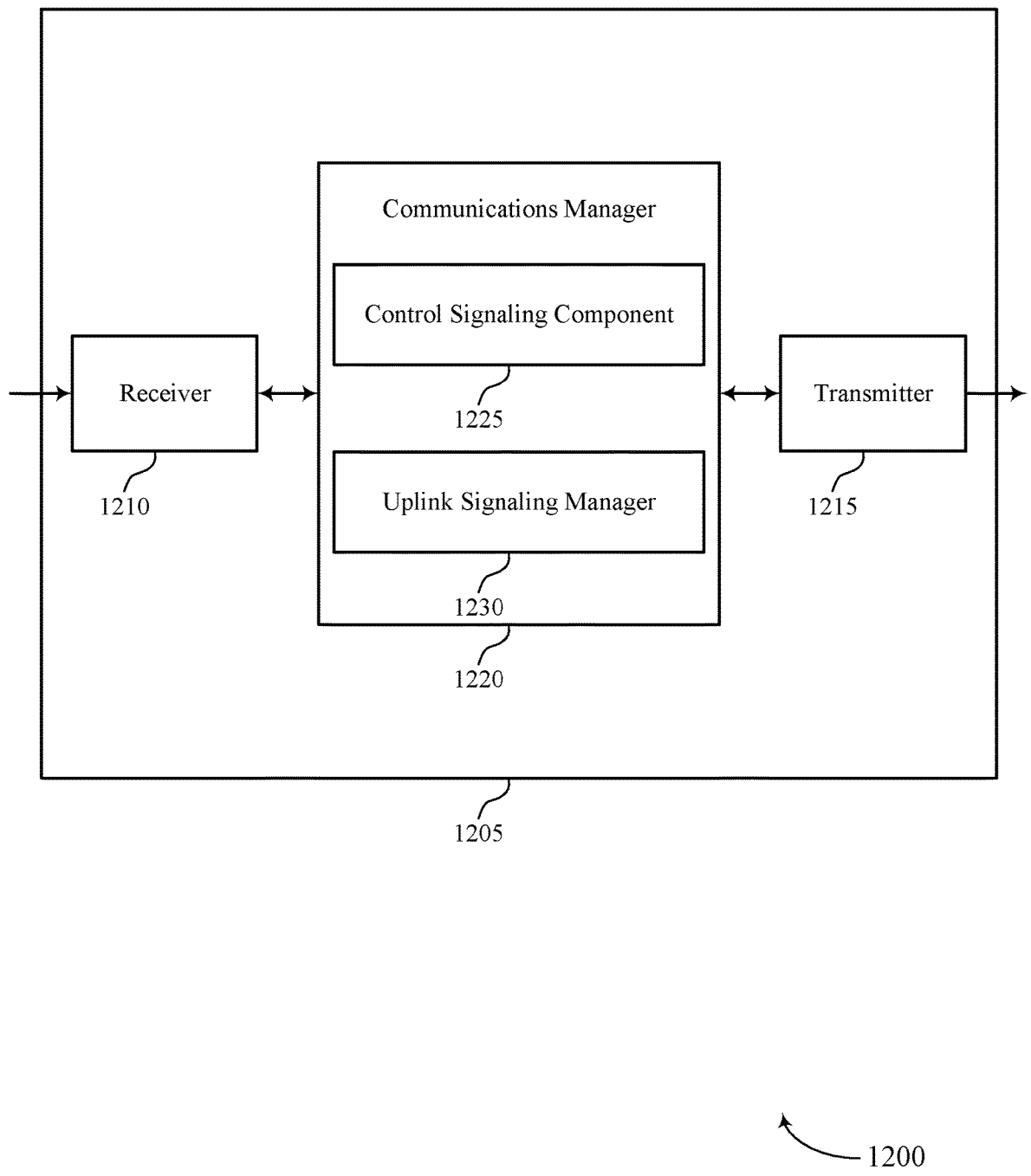

FIG. 12 shows a block diagram 1200 of a device 1205 that supports techniques for modifying a spatial relationship of an uplink channel in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for modifying a spatial relationship of an uplink channel). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for modifying a spatial relationship of an uplink channel). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for modifying a spatial relationship of an uplink channel as described herein. For example, the communications manager 1220 may include a control signaling component 1225 an uplink signaling manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The control signaling component 1225 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The uplink signaling manager 1230 may be configured as or otherwise support a means for receiving the first uplink signal in accordance with the first spatial relation parameter. The uplink signaling manager 1230 may be configured as or otherwise support a means for receiving, in response to transmitting the control signaling, the second uplink signal in accordance with the first spatial relation parameter based on a size of a switch duration associated with using the second spatial relation parameter after using the first spatial relation parameter.

Additionally or alternatively, the communications manager 1220 may support wireless communication at a base station in accordance with examples as disclosed herein. The control signaling component 1225 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The uplink signaling manager 1230 may be configured as or otherwise support a means for receiving a first portion of the first uplink signal in accordance with the first spatial relation parameter based on a size of a switch duration associated with using the second spatial relation parameter after using the first spatial relation parameter. The uplink signaling manager 1230 may be configured as or otherwise support a means for receiving, in response to transmitting the control signaling, a second portion of the second uplink signal in accordance with the second spatial relation parameter.

Figure 13:
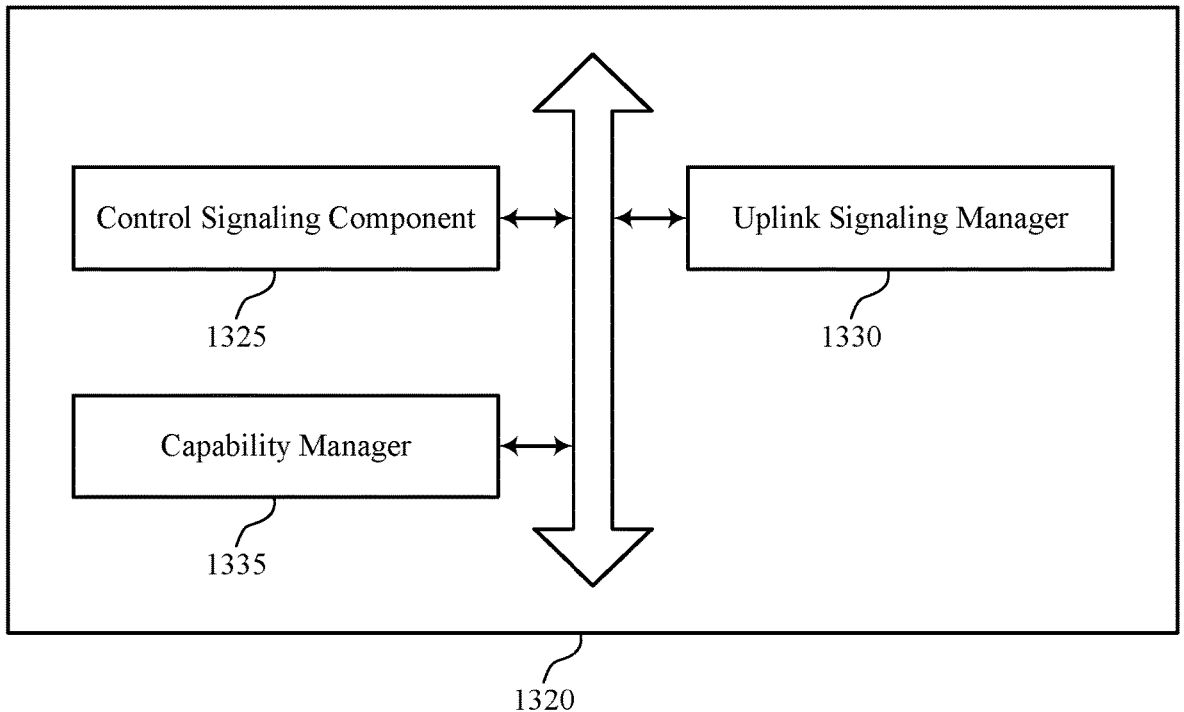
FIG. 13 shows a block diagram of a communications manager that supports techniques for modifying a spatial relationship of an uplink channel in accordance with aspects of the present disclosure.

FIG. 13 shows a block diagram 1300 of a communications manager 1320 that supports techniques for modifying a spatial relationship of an uplink channel in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for modifying a spatial relationship of an uplink channel as described herein. For example, the communications manager 1320 may include a control signaling component 1325, an uplink signaling manager 1330, a capability manager 1335, or any combination thereof. Each of these components may communicate, directly or indirectly, with one another (e.g., via one or more buses).

The communications manager 1320 may support wireless communication at a base station in accordance with examples as disclosed herein. The control signaling component 1325 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The uplink signaling manager 1330 may be configured as or otherwise support a means for receiving the first uplink signal in accordance with the first spatial relation parameter. In some examples, the uplink signaling manager 1330 may be configured as or otherwise support a means for receiving, in response to transmitting the control signaling, the second uplink signal in accordance with the first spatial relation parameter based on a size of a switch duration associated with using the second spatial relation parameter after using the first spatial relation parameter.

In some examples, the uplink signaling manager 1330 may be configured as or otherwise support a means for receiving, in response to transmitting the control signaling, a third uplink signal in accordance with the second spatial relation parameter based on the size of the switch duration, where the control signaling further indicates the second spatial relation parameter is to be used for transmission of the third uplink signal.

In some examples, a first size of a first duration between a first allocation associated with the first uplink signal and a second allocation associated with the second uplink signal is less than the size of the switch duration. In some examples, a second size of a second duration between the second allocation associated with the second uplink signal and a third allocation associated with the third uplink signal is greater than the size of the switch duration.

In some examples, the uplink signaling manager 1330 may be configured as or otherwise support a means for receiving, in response to transmitting the control signaling, a third uplink signal in accordance with the first spatial relation parameter based on the size of the switch duration, where the control signaling indicates the second spatial relation parameter is to be used for transmission of the third uplink signal.

In some examples, a first size of a first duration between a first allocation associated with the first uplink signal and a second allocation associated with the second uplink signal is less than the size of the switch duration. In some examples, a second size of a second duration between the second allocation associated with the second uplink signal and a third allocation associated with the third uplink signal is less than the size of the switch duration.

In some examples, the uplink signaling manager 1330 may be configured as or otherwise support a means for receiving signaling indicating a cancellation of a third uplink signal based on based on the size of the switch duration.

In some examples, the control signaling includes a serving cell identifier, a bandwidth part identifier, a resource identifier associated with the second uplink signal, one or more bits indicating the second spatial parameter, one or more reserved bits, or any combination thereof.

In some examples, the control signaling includes a downlink control information message or a MAC-CE.

In some examples, the first uplink signal includes a first PUSCH, a first PUCCH, or both. In some examples, the second uplink signal includes a second PUSCH, a second PUCCH, or both.

Additionally or alternatively, the communications manager 1320 may support wireless communication at a base station in accordance with examples as disclosed herein. In some examples, the control signaling component 1325 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. In some examples, the uplink signaling manager 1330 may be configured as or otherwise support a means for receiving a first portion of the first uplink signal in accordance with the first spatial relation parameter based on a size of a switch duration associated with using the second spatial relation parameter after using the first spatial relation parameter. In some examples, the uplink signaling manager 1330 may be configured as or otherwise support a means for receiving, in response to transmitting the control signaling, a second portion of the second uplink signal in accordance with the second spatial relation parameter.

In some examples, the uplink signaling manager 1330 may be configured as or otherwise support a means for refraining from monitoring for a third portion of the first uplink signal based on the size of the switch duration, where the first uplink signal includes the first portion and the third portion.

In some examples, the uplink signaling manager 1330 may be configured as or otherwise support a means for refraining from monitoring for a third portion of the second uplink signal based on the size of the switch duration, where the second uplink signal includes the second portion and the third portion.

In some examples, the control signaling component 1325 may be configured as or otherwise support a means for transmitting signaling indicating a third portion to be discarded based on the size of the switch duration, where the first uplink signal or the second uplink signal includes the third portion.

In some examples, the capability manager 1335 may be configured as or otherwise support a means for receiving signaling indicating a switching capability of the UE, where the signaling indicating the third portion is transmitted in response to the signaling indicating the switching capability.

In some examples, the first portion of the first uplink signal and the second portion of the second uplink signal are received in response to receiving the signaling indicating the third portion.

In some examples, the third portion includes a symbol or a portion of a symbol.

In some examples, the control signaling includes a serving cell identifier, a bandwidth part identifier, a resource identifier associated with the second uplink signal, one or more bits indicating the second spatial parameter, one or more reserved bits, or any combination thereof.

In some examples, the control signaling includes a downlink control information message or a MAC-CE.

In some examples, the first uplink signal includes a first PUSCH, a first PUCCH, or both. In some examples, the second uplink signal includes a second PUSCH, a second PUCCH, or both.

Figure 14:
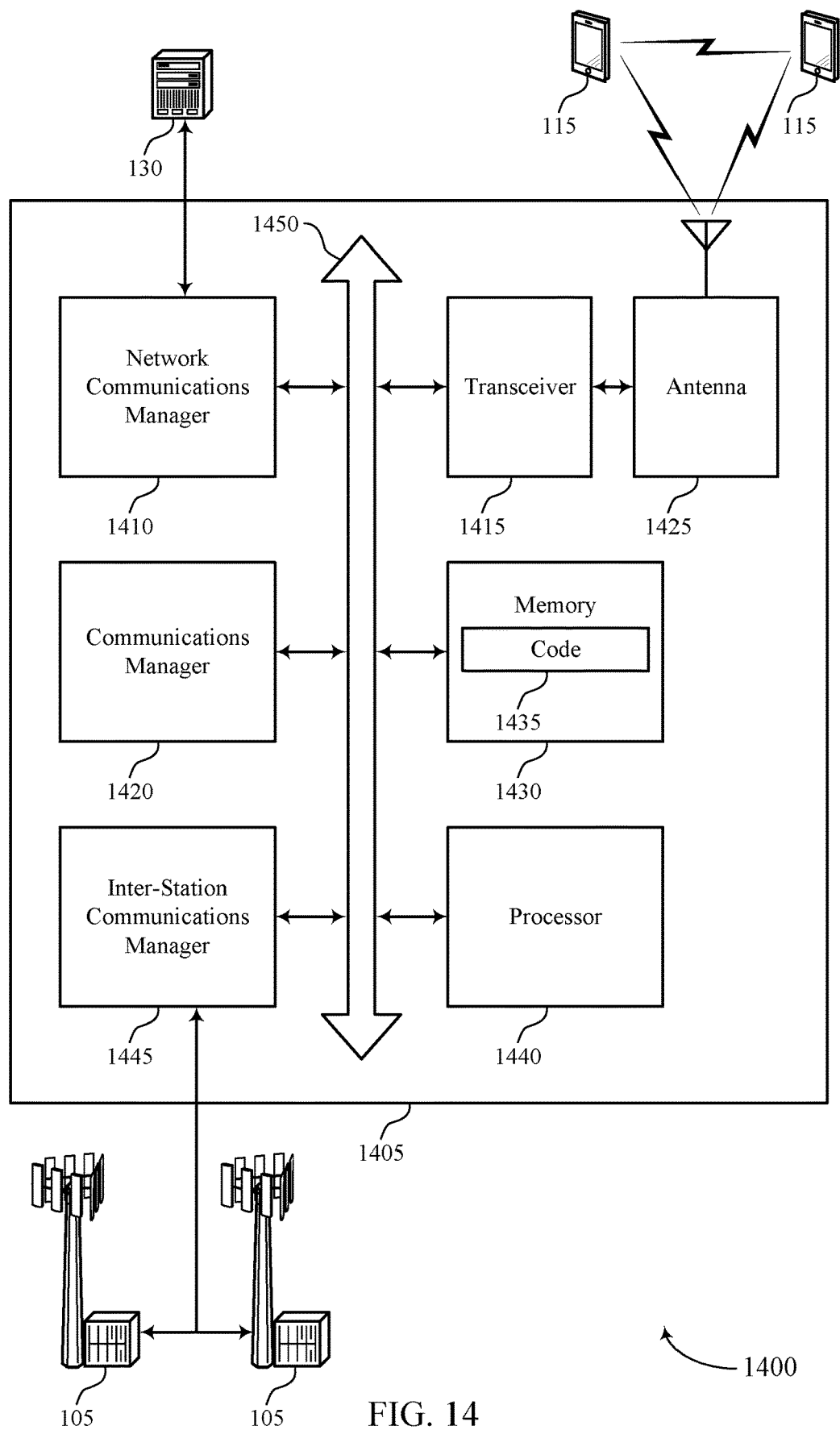
FIG. 14 shows a diagram of a system including a device that supports techniques for modifying a spatial relationship of an uplink channel in accordance with aspects of the present disclosure.

FIG. 14 shows a diagram of a system 1400 including a device 1405 that supports techniques for modifying a spatial relationship of an uplink channel in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for modifying a spatial relationship of an uplink channel). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The communications manager 1420 may be configured as or otherwise support a means for receiving the first uplink signal in accordance with the first spatial relation parameter. The communications manager 1420 may be configured as or otherwise support a means for receiving, in response to transmitting the control signaling, the second uplink signal in accordance with the first spatial relation parameter based on a size of a switch duration associated with using the second spatial relation parameter after using the first spatial relation parameter.

Additionally or alternatively, the communications manager 1420 may support wireless communication at a base station in accordance with examples as disclosed herein. For example, the communications manager 1420 may be configured as or otherwise support a means for transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The communications manager 1420 may be configured as or otherwise support a means for receiving a first portion of the first uplink signal in accordance with the first spatial relation parameter based on a size of a switch duration associated with using the second spatial relation parameter after using the first spatial relation parameter. The communications manager 1420 may be configured as or otherwise support a means for receiving, in response to transmitting the control signaling, a second portion of the second uplink signal in accordance with the second spatial relation parameter.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or more consistent beam service.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for modifying a spatial relationship of an uplink channel as described herein, or the processor 1440 and the memory 1430 may be otherwise configured to perform or support such operations.

Figure 15:
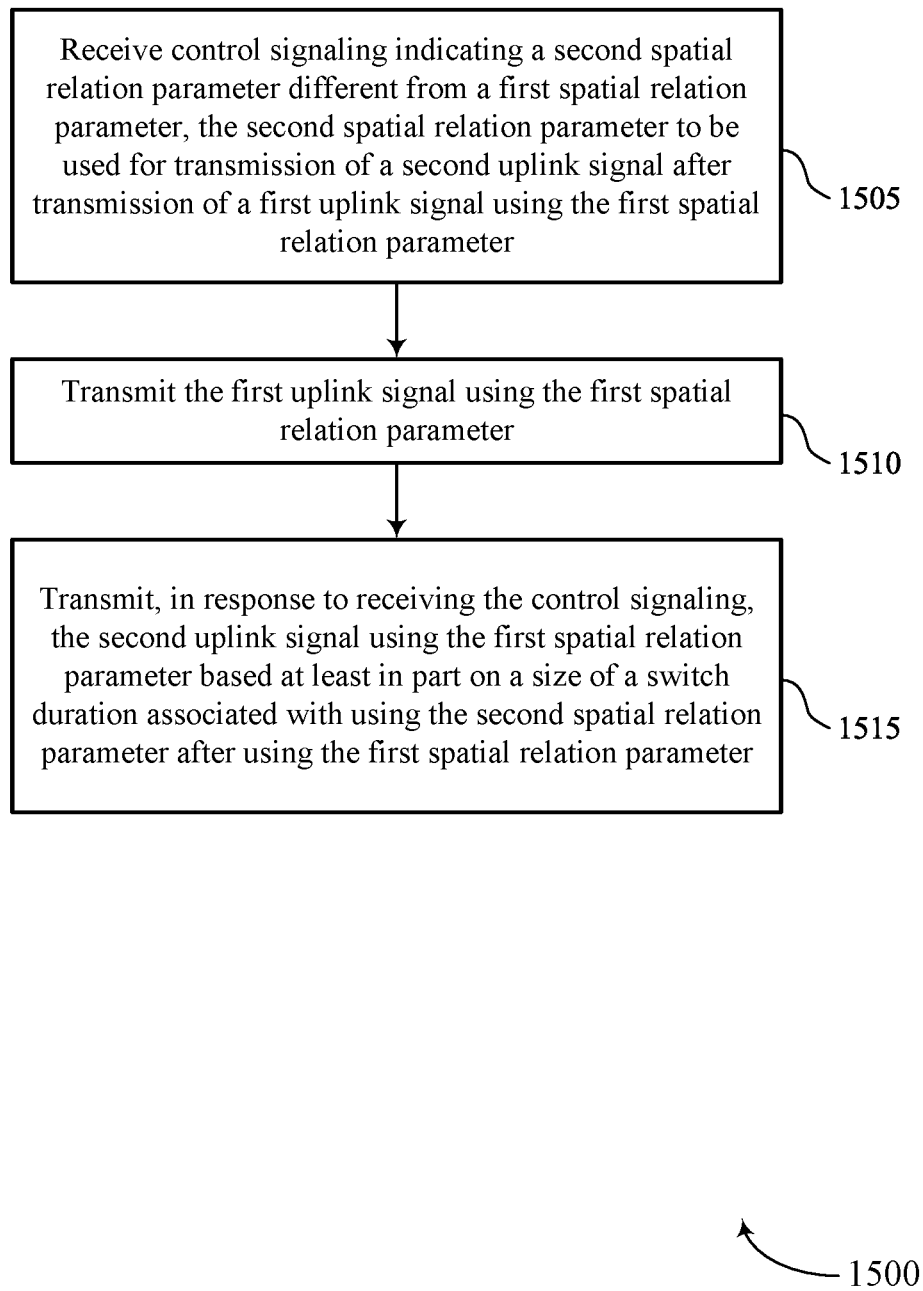
FIGS. 15 through 18 show flowcharts illustrating methods that support techniques for modifying a spatial relationship of an uplink channel in accordance with aspects of the present disclosure.

FIG. 15 shows a flowchart illustrating a method 1500 that supports techniques for modifying a spatial relationship of an uplink channel in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a second spatial relation parameter different from a first spatial relation parameter, the second spatial relation parameter to be used for transmission of a second uplink signal after transmission of a first uplink signal using the first spatial relation parameter. The operations of 1505 may be performed in accordance with examples as disclosed herein. In some examples, aspects of the operations of 1505 may be performed by a control signaling manager 925 as described with reference to FIG. 9.

At 1510, the method may include transmitting the first uplink signal using the first spatial relation parameter. The operations of 1510 may be performed in accordance with examples as disclosed herein. In some examples, aspects of the operations of 1510 may be performed by an uplink signaling component 930 as described with reference to FIG. 9.

At 1515, the method may include transmitting, in response to receiving the control signaling, the second uplink signal using the first spatial relation parameter based on a size of a switch duration associated with using the second spatial relation parameter after using the first spatial relation parameter. The operations of 1515 may be performed in accordance with examples as disclosed herein. In some examples, aspects of the operations of 1515 may be performed by an uplink signaling component 930 as described with reference to FIG. 9.

Figure 16:
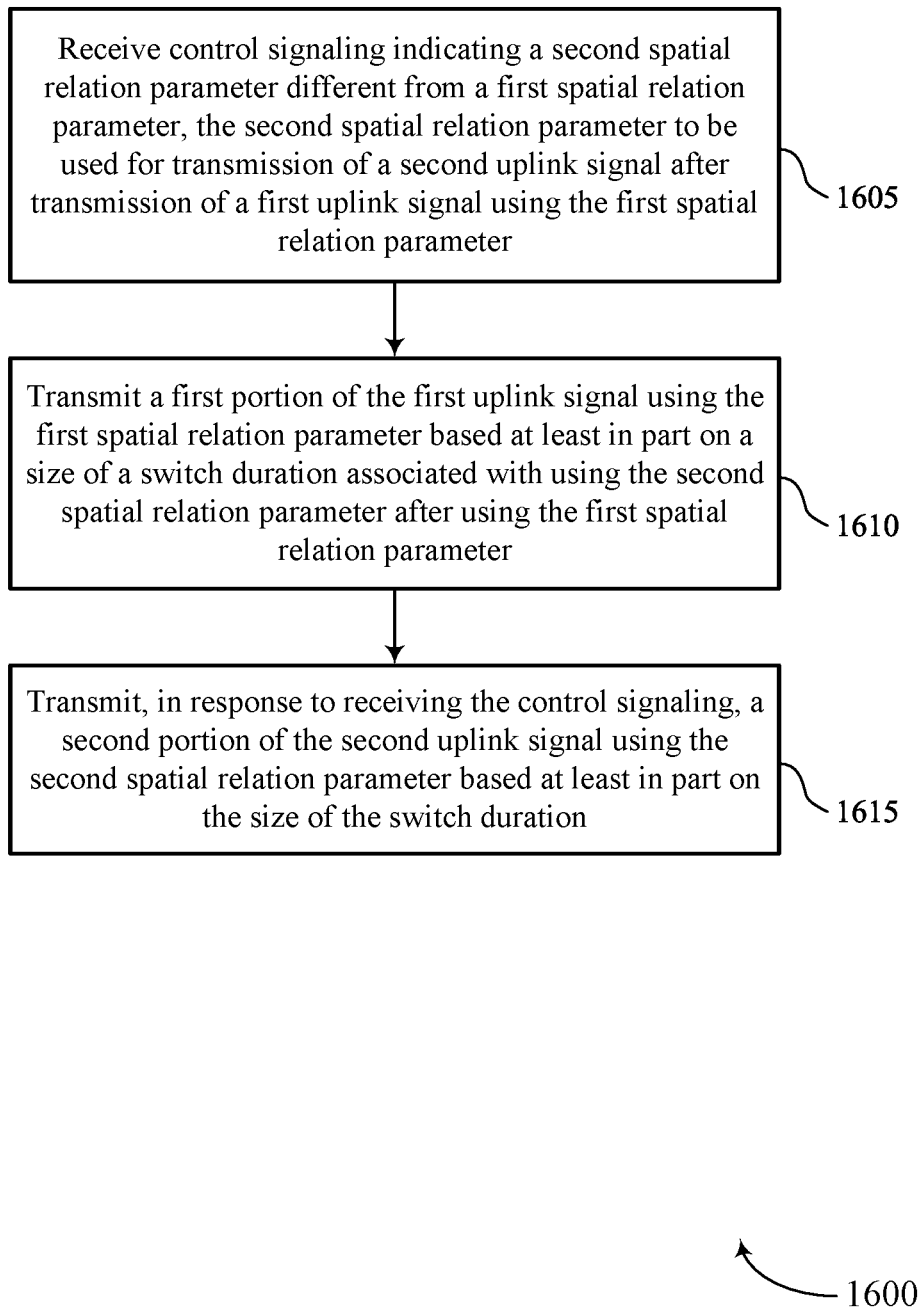

FIG. 16 shows a flowchart illustrating a method 1600 that supports techniques for modifying a spatial relationship of an uplink channel in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a second spatial relation parameter different from a first spatial relation parameter, the second spatial relation parameter to be used for transmission of a second uplink signal after transmission of a first uplink signal using the first spatial relation parameter. The operations of 1605 may be performed in accordance with examples as disclosed herein. In some examples, aspects of the operations of 1605 may be performed by a control signaling manager 925 as described with reference to FIG. 9.

At 1610, the method may include transmitting a first portion of the first uplink signal using the first spatial relation parameter based on a size of a switch duration associated with using the second spatial relation parameter after using the first spatial relation parameter. The operations of 1610 may be performed in accordance with examples as disclosed herein. In some examples, aspects of the operations of 1610 may be performed by an uplink signaling component 930 as described with reference to FIG. 9.

At 1615, the method may include transmitting, in response to receiving the control signaling, a second portion of the second uplink signal using the second spatial relation parameter based on the size of the switch duration. The operations of 1615 may be performed in accordance with examples as disclosed herein. In some examples, aspects of the operations of 1615 may be performed by an uplink signaling component 930 as described with reference to FIG. 9.

Figure 17:
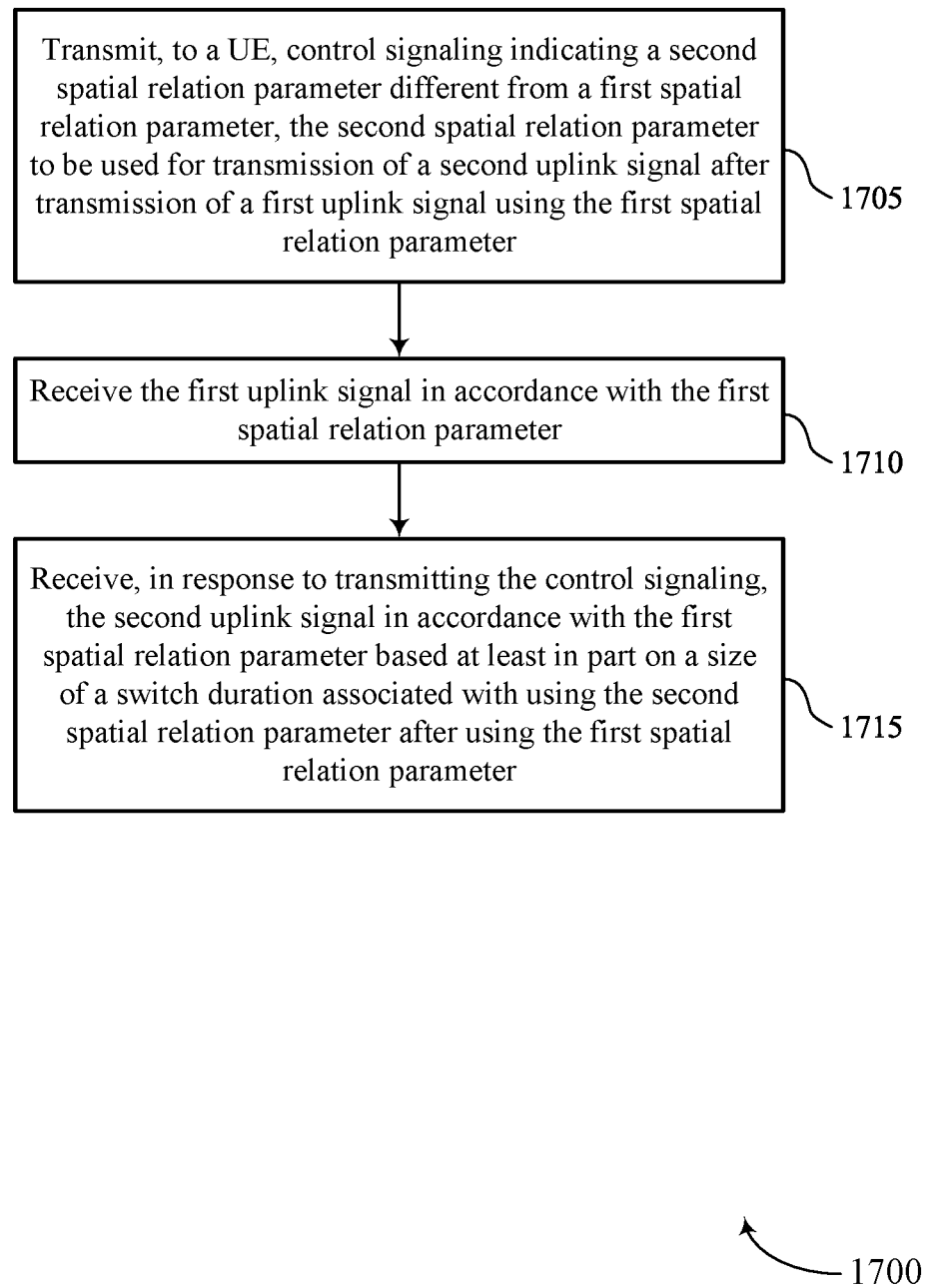

FIG. 17 shows a flowchart illustrating a method 1700 that supports techniques for modifying a spatial relationship of an uplink channel in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The operations of 1705 may be performed in accordance with examples as disclosed herein. In some examples, aspects of the operations of 1705 may be performed by a control signaling component 1325 as described with reference to FIG. 13.

At 1710, the method may include receiving the first uplink signal in accordance with the first spatial relation parameter. The operations of 1710 may be performed in accordance with examples as disclosed herein. In some examples, aspects of the operations of 1710 may be performed by an uplink signaling manager 1330 as described with reference to FIG. 13.

At 1715, the method may include receiving, in response to transmitting the control signaling, the second uplink signal in accordance with the first spatial relation parameter based on a size of a switch duration associated with using the second spatial relation parameter after using the first spatial relation parameter. The operations of 1715 may be performed in accordance with examples as disclosed herein. In some examples, aspects of the operations of 1715 may be performed by an uplink signaling manager 1330 as described with reference to FIG. 13.

Figure 18:
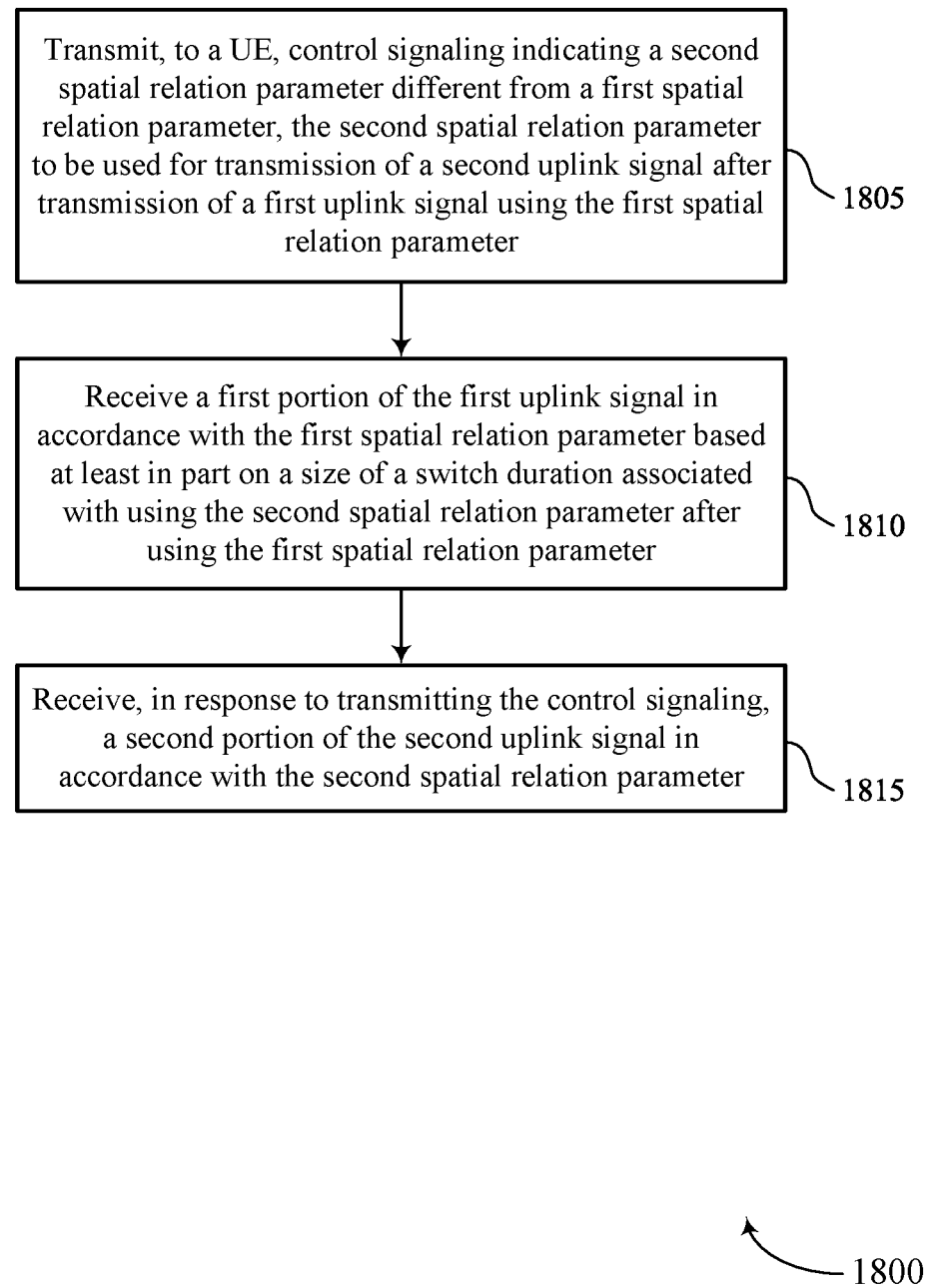

FIG. 18 shows a flowchart illustrating a method 1800 that supports techniques for modifying a spatial relationship of an uplink channel in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating a second spatial relation parameter different from a first spatial relation parameter, the second spatial relation parameter to be used for transmission of a second uplink signal after transmission of a first uplink signal using the first spatial relation parameter. The operations of 1805 may be performed in accordance with examples as disclosed herein. In some examples, aspects of the operations of 1805 may be performed by a control signaling component 1325 as described with reference to FIG. 13.

At 1810, the method may include receiving a first portion of the first uplink signal in accordance with the first spatial relation parameter based on a size of a switch duration associated with using the second spatial relation parameter after using the first spatial relation parameter. The operations of 1810 may be performed in accordance with examples as disclosed herein. In some examples, aspects of the operations of 1810 may be performed by an uplink signaling manager 1330 as described with reference to FIG. 13.

At 1815, the method may include receiving, in response to transmitting the control signaling, a second portion of the second uplink signal in accordance with the second spatial relation parameter. The operations of 1815 may be performed in accordance with examples as disclosed herein. In some examples, aspects of the operations of 1815 may be performed by an uplink signaling manager 1330 as described with reference to FIG. 13.

The following provides an overview of aspects of the present disclosure:

Aspect 1: A method for wireless communication at a UE, comprising: receiving control signaling indicating a second spatial relation parameter different from a first spatial relation parameter, the second spatial relation parameter to be used for transmission of a second uplink signal after transmission of a first uplink signal using the first spatial relation parameter; transmitting the first uplink signal using the first spatial relation parameter; and transmitting, in response to receiving the control signaling, the second uplink signal using the first spatial relation parameter based at least in part on a size of a switch duration associated with using the second spatial relation parameter after using the first spatial relation parameter.

Aspect 2: The method of aspect 1, further comprising: transmitting, in response to receiving the control signaling, a third uplink signal using the second spatial relation parameter based at least in part on the size of the switch duration, wherein the control signaling further indicates the second spatial relation parameter is to be used for transmission of the third uplink signal.

Aspect 3: The method of aspect 2, wherein a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is greater than the size of the switch duration.

Aspect 4: The method of any of aspects 1 through 3, further comprising: transmitting, in response to receiving the control signaling, a third uplink signal using the first spatial relation parameter based at least in part on the size of the switch duration, wherein the control signaling indicates the second spatial relation parameter is to be used for transmission of the third uplink signal.

Aspect 5: The method of aspect 4, wherein a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is less than the size of the switch duration.

Aspect 6: The method of any of aspects 1 through 5, further comprising: receiving signaling indicating a cancellation of a third uplink signal based at least in part on based at least in part on the size of the switch duration.

Aspect 7: The method of any of aspects 1 through 6, further comprising: discarding the indication of the second spatial parameter based at least in part on an expiration of a timer associated with the control signaling.

Aspect 8: The method of any of aspects 1 through 7, wherein the control signaling comprises a serving cell identifier, a bandwidth part identifier, a resource identifier associated with the second uplink signal, one or more bits indicating the second spatial parameter, one or more reserved bits, or any combination thereof.

Aspect 9: The method of any of aspects 1 through 8, wherein the control signaling comprises a downlink control information message or a medium access control (MAC) control element (MAC-CE).

Aspect 10: The method of any of aspects 1 through 9, wherein the first uplink signal comprises a first PUSCH, a first PUCCH, or both; and the second uplink signal comprises a second PUSCH, a second PUCCH, or both.

Aspect 11: A method for wireless communication at a UE, comprising: receiving control signaling indicating a second spatial relation parameter different from a first spatial relation parameter, the second spatial relation parameter to be used for transmission of a second uplink signal after transmission of a first uplink signal using the first spatial relation parameter; transmitting a first portion of the first uplink signal using the first spatial relation parameter based at least in part on a size of a switch duration associated with using the second spatial relation parameter after using the first spatial relation parameter; and transmitting, in response to receiving the control signaling, a second portion of the second uplink signal using the second spatial relation parameter based at least in part on the size of the switch duration.

Aspect 12: The method of aspect 11, further comprising: discarding a third portion of the first uplink signal based at least in part on the size of the switch duration, wherein the first uplink signal comprises the first portion and the third portion.

Aspect 13: The method of any of aspects 11 through 12, further comprising: discarding a third portion of the second uplink signal based at least in part on the size of the switch duration, wherein the second uplink signal comprises the second portion and the third portion.

Aspect 14: The method of any of aspects 11 through 13, further comprising: receiving signaling indicating a third portion to be discarded based at least in part on the size of the switch duration, wherein the first uplink signal or the second uplink signal comprises the third portion.

Aspect 15: The method of aspect 14, further comprising: transmitting signaling indicating a switching capability of the UE, wherein the signaling indicating the third portion is received in response to the signaling indicating the switching capability.

Aspect 16: The method of any of aspects 14 through 15, wherein the first portion of the first uplink signal and the second portion of the second uplink signal are transmitted in response to receiving the signaling indicating the third portion.

Aspect 17: The method of any of aspects 14 through 16, wherein the third portion comprises a symbol or a portion of a symbol.

Aspect 18: The method of any of aspects 11 through 17, wherein the control signaling comprises a serving cell identifier, a bandwidth part identifier, a resource identifier associated with the second uplink signal, one or more bits indicating the second spatial parameter, one or more reserved bits, or any combination thereof.

Aspect 19: The method of any of aspects 11 through 18, wherein the control signaling comprises a downlink control information message or a medium access control (MAC) control element (MAC-CE).

Aspect 20: The method of any of aspects 11 through 19, wherein the first uplink signal comprises a first PUSCH, a first PUCCH, or both; and the second uplink signal comprises a second PUSCH, a second PUCCH, or both.

Aspect 21: A method for wireless communication at a base station, comprising: transmitting, to a UE, control signaling indicating a second spatial relation parameter different from a first spatial relation parameter, the second spatial relation parameter to be used for transmission of a second uplink signal after transmission of a first uplink signal using the first spatial relation parameter; receiving the first uplink signal in accordance with the first spatial relation parameter; and receiving, in response to transmitting the control signaling, the second uplink signal in accordance with the first spatial relation parameter based at least in part on a size of a switch duration associated with using the second spatial relation parameter after using the first spatial relation parameter.

Aspect 22: The method of aspect 21, further comprising: receiving, in response to transmitting the control signaling, a third uplink signal in accordance with the second spatial relation parameter based at least in part on the size of the switch duration, wherein the control signaling further indicates the second spatial relation parameter is to be used for transmission of the third uplink signal.

Aspect 23: The method of aspect 22, wherein a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is greater than the size of the switch duration.

Aspect 24: The method of any of aspects 21 through 23, further comprising: receiving, in response to transmitting the control signaling, a third uplink signal in accordance with the first spatial relation parameter based at least in part on the size of the switch duration, wherein the control signaling indicates the second spatial relation parameter is to be used for transmission of the third uplink signal.

Aspect 25: The method of aspect 24, wherein a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is less than the size of the switch duration.

Aspect 26: The method of any of aspects 21 through 25, further comprising: receiving signaling indicating a cancellation of a third uplink signal based at least in part on based at least in part on the size of the switch duration.

Aspect 27: The method of any of aspects 21 through 26, wherein the control signaling comprises a serving cell identifier, a bandwidth part identifier, a resource identifier associated with the second uplink signal, one or more bits indicating the second spatial parameter, one or more reserved bits, or any combination thereof.

Aspect 28: The method of any of aspects 21 through 27, wherein the control signaling comprises a downlink control information message or a medium access control (MAC) control element (MAC-CE).

Aspect 29: The method of any of aspects 21 through 28, wherein the first uplink signal comprises a first PUSCH, a first PUCCH, or both; and the second uplink signal comprises a second PUSCH, a second PUCCH, or both.

Aspect 30: A method for wireless communication at a base station, comprising: transmitting, to a UE, control signaling indicating a second spatial relation parameter different from a first spatial relation parameter, the second spatial relation parameter to be used for transmission of a second uplink signal after transmission of a first uplink signal using the first spatial relation parameter; receiving a first portion of the first uplink signal in accordance with the first spatial relation parameter based at least in part on a size of a switch duration associated with using the second spatial relation parameter after using the first spatial relation parameter; and receiving, in response to transmitting the control signaling, a second portion of the second uplink signal in accordance with the second spatial relation parameter.

Aspect 31: The method of aspect 30, further comprising: refraining from monitoring for a third portion of the first uplink signal based at least in part on the size of the switch duration, wherein the first uplink signal comprises the first portion and the third portion.

Aspect 32: The method of any of aspects 30 through 31, further comprising: refraining from monitoring for a third portion of the second uplink signal based at least in part on the size of the switch duration, wherein the second uplink signal comprises the second portion and the third portion.

Aspect 33: The method of any of aspects 30 through 32, further comprising: transmitting signaling indicating a third portion to be discarded based at least in part on the size of the switch duration, wherein the first uplink signal or the second uplink signal comprises the third portion.

Aspect 34: The method of aspect 33, further comprising: receiving signaling indicating a switching capability of the UE, wherein the signaling indicating the third portion is transmitted in response to the signaling indicating the switching capability.

Aspect 35: The method of any of aspects 33 through 34, wherein the first portion of the first uplink signal and the second portion of the second uplink signal are received in response to receiving the signaling indicating the third portion.

Aspect 36: The method of any of aspects 33 through 35, wherein the third portion comprises a symbol or a portion of a symbol.

Aspect 37: The method of any of aspects 30 through 36, wherein the control signaling comprises a serving cell identifier, a bandwidth part identifier, a resource identifier associated with the second uplink signal, one or more bits indicating the second spatial parameter, one or more reserved bits, or any combination thereof.

Aspect 38: The method of any of aspects 30 through 37, wherein the control signaling comprises a downlink control information message or a medium access control (MAC) control element (MAC-CE).

Aspect 39: The method of any of aspects 30 through 38, wherein the first uplink signal comprises a first PUSCH, a first PUCCH, or both; and the second uplink signal comprises a second PUSCH, a second PUCCH, or both.

Aspect 40: An apparatus for wireless communication at a UE, comprising a processor; memory coupled with the processor; and instructions stored in the memory and executable by the processor to cause the apparatus to perform a method of any of aspects 1 through 10.

Aspect 41: An apparatus for wireless communication at a UE, comprising at least one means for performing a method of any of aspects 1 through 10.

Aspect 42: A non-transitory computer-readable medium storing code for wireless communication at a UE, the code comprising instructions executable by a processor to perform a method of any of aspects 1 through 10.

Aspect 43: An apparatus for wireless communication at a UE, comprising a processor; memory coupled with the processor; and instructions stored in the memory and executable by the processor to cause the apparatus to perform a method of any of aspects 11 through 20.

Aspect 44: An apparatus for wireless communication at a UE, comprising at least one means for performing a method of any of aspects 11 through 20.

Aspect 45: A non-transitory computer-readable medium storing code for wireless communication at a UE, the code comprising instructions executable by a processor to perform a method of any of aspects 11 through 20.

Aspect 46: An apparatus for wireless communication at a base station, comprising a processor; memory coupled with the processor; and instructions stored in the memory and executable by the processor to cause the apparatus to perform a method of any of aspects 21 through 29.

Aspect 47: An apparatus for wireless communication at a base station, comprising at least one means for performing a method of any of aspects 21 through 29.

Aspect 48: A non-transitory computer-readable medium storing code for wireless communication at a base station, the code comprising instructions executable by a processor to perform a method of any of aspects 21 through 29.

Aspect 49: An apparatus for wireless communication at a base station, comprising a processor; memory coupled with the processor; and instructions stored in the memory and executable by the processor to cause the apparatus to perform a method of any of aspects 30 through 39.

Aspect 50: An apparatus for wireless communication at a base station, comprising at least one means for performing a method of any of aspects 30 through 39.

Aspect 51: A non-transitory computer-readable medium storing code for wireless communication at a base station, the code comprising instructions executable by a processor to perform a method of any of aspects 30 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a second spatial relation parameter different from a first spatial relation parameter, the second spatial relation parameter to be used for transmission of a second uplink signal after transmission of a first uplink signal using the first spatial relation parameter;
   transmitting the first uplink signal using the first spatial relation parameter; and
   transmitting, in response to receiving the control signaling, the second uplink signal using the first spatial relation parameter based at least in part on a size of a switch duration associated with using the second spatial relation parameter after using the first spatial relation parameter.

2. The method of claim 1, further comprising:
   transmitting, in response to receiving the control signaling, a third uplink signal using the second spatial relation parameter based at least in part on the size of the switch duration, wherein the control signaling further indicates the second spatial relation parameter is to be used for transmission of the third uplink signal.

3. The method of claim 2, wherein:
   a first size of a first duration between a first allocation associated with the first uplink signal and a second allocation associated with the second uplink signal is less than the size of the switch duration; and
   a second size of a second duration between the second allocation associated with the second uplink signal and a third allocation associated with the third uplink signal is greater than the size of the switch duration.

4. The method of claim 1, further comprising:
   transmitting, in response to receiving the control signaling, a third uplink signal using the first spatial relation parameter based at least in part on the size of the switch duration, wherein the control signaling indicates the second spatial relation parameter is to be used for transmission of the third uplink signal.

5. The method of claim 4, wherein:
   a first size of a first duration between a first allocation associated with the first uplink signal and a second allocation associated with the second uplink signal is less than the size of the switch duration; and
   a second size of a second duration between the second allocation associated with the second uplink signal and a third allocation associated with the third uplink signal is less than the size of the switch duration.

6. The method of claim 1, further comprising:
   receiving signaling indicating a cancellation of a third uplink signal based at least in part on based at least in part on the size of the switch duration.

7. The method of claim 1, further comprising:
   discarding the indication of the second spatial parameter based at least in part on an expiration of a timer associated with the control signaling.

8. The method of claim 1, wherein the control signaling comprises a serving cell identifier, a bandwidth part identifier, a resource identifier associated with the second uplink signal, one or more bits indicating the second spatial parameter, one or more reserved bits, or any combination thereof.

9. A method for wireless communication at a user equipment (UE), comprising:

receiving control signaling indicating a second spatial relation parameter different from a first spatial relation parameter, the second spatial relation parameter to be used for transmission of a second uplink signal after transmission of a first uplink signal using the first spatial relation parameter;

transmitting a first portion of the first uplink signal using the first spatial relation parameter based at least in part on a size of a switch duration associated with using the second spatial relation parameter after using the first spatial relation parameter; and transmitting, in response to receiving the control signaling, a second portion of the second uplink signal using the second spatial relation parameter based at least in part on the size of the switch duration.

10. The method of claim 9, further comprising:
discarding a third portion of the first uplink signal based at least in part on the size of the switch duration, wherein the first uplink signal comprises the first portion and the third portion.

11. The method of claim 9, further comprising:
discarding a third portion of the second uplink signal based at least in part on the size of the switch duration, wherein the second uplink signal comprises the second portion and the third portion.

12. The method of claim 9, further comprising:
receiving signaling indicating a third portion to be discarded based at least in part on the size of the switch duration, wherein the first uplink signal or the second uplink signal comprises the third portion.

13. The method of claim 12, further comprising:
transmitting signaling indicating a switching capability of the UE, wherein the signaling indicating the third portion is received in response to the signaling indicating the switching capability.

14. The method of claim 12, wherein the first portion of the first uplink signal and the second portion of the second uplink signal are transmitted in response to receiving the signaling indicating the third portion.

15. The method of claim 12, wherein the third portion comprises a symbol or a portion of a symbol.

16. The method of claim 9, wherein the control signaling comprises a serving cell identifier, a bandwidth part identifier, a resource identifier associated with the second uplink signal, one or more bits indicating the second spatial parameter, one or more reserved bits, or any combination thereof.

17. A method for wireless communication at a base station, comprising:
transmitting, to a user equipment (UE), control signaling indicating a second spatial relation parameter different from a first spatial relation parameter, the second spatial relation parameter to be used for transmission of a second uplink signal after transmission of a first uplink signal using the first spatial relation parameter;

receiving the first uplink signal in accordance with the first spatial relation parameter; and receiving, in response to transmitting the control signaling, the second uplink signal in accordance with the first spatial relation parameter based at least in part on a size of a switch duration associated with using the second spatial relation parameter after using the first spatial relation parameter.

18. The method of claim 17, further comprising:
receiving, in response to transmitting the control signaling, a third uplink signal in accordance with the second spatial relation parameter based at least in part on the size of the switch duration, wherein the control signaling further indicates the second spatial relation parameter is to be used for transmission of the third uplink signal.

19. The method of claim 18, wherein:
a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is greater than the size of the switch duration.

20. The method of claim 17, further comprising:
receiving, in response to transmitting the control signaling, a third uplink signal in accordance with the first spatial relation parameter based at least in part on the size of the switch duration, wherein the control signaling indicates the second spatial relation parameter is to be used for transmission of the third uplink signal.

21. The method of claim 20, wherein:
a first size of a first duration between a first allocation associated with the first uplink signal and a second allocation associated with the second uplink signal is less than the size of the switch duration; and a second size of a second duration between the second allocation associated with the second uplink signal and a third allocation associated with the third uplink signal is less than the size of the switch duration.

22. The method of claim 17, further comprising:
receiving signaling indicating a cancellation of a third uplink signal based at least in part on based at least in part on the size of the switch duration.

23. The method of claim 17, wherein the control signaling comprises a serving cell identifier, a bandwidth part identifier, a resource identifier associated with the second uplink signal, one or more bits indicating the second spatial parameter, one or more reserved bits, or any combination thereof.

24. A method for wireless communication at a base station, comprising:
transmitting, to a user equipment (UE), control signaling indicating a second spatial relation parameter different from a first spatial relation parameter, the second spatial relation parameter to be used for transmission of a second uplink signal after transmission of a first uplink signal using the first spatial relation parameter;

receiving a first portion of the first uplink signal in accordance with the first spatial relation parameter based at least in part on a size of a switch duration associated with using the second spatial relation parameter after using the first spatial relation parameter; and receiving, in response to transmitting the control signaling, a second portion of the second uplink signal in accordance with the second spatial relation parameter.

25. The method of claim 24, further comprising:
refraining from monitoring for a third portion of the first uplink signal based at least in part on the size of the switch duration, wherein the first uplink signal comprises the first portion and the third portion.

26. The method of claim 24, further comprising:
refraining from monitoring for a third portion of the second uplink signal based at least in part on the size of the switch duration, wherein the second uplink signal comprises the second portion and the third portion.

27. The method of claim 24, further comprising:
transmitting signaling indicating a third portion to be discarded based at least in part on the size of the switch duration, wherein the first uplink signal or the second uplink signal comprises the third portion.

28. The method of claim 27, further comprising:
receiving signaling indicating a switching capability of the UE, wherein the signaling indicating the third portion is transmitted in response to the signaling indicating the switching capability.

29. The method of claim 27, wherein the first portion of the first uplink signal and the second portion of the second uplink signal are received in response to receiving the signaling indicating the third portion.

30. The method of claim 27, wherein the third portion comprises a symbol or a portion of a symbol.

* * * * *